US011939260B2

(12) United States Patent
Botu et al.

(10) Patent No.: US 11,939,260 B2
(45) Date of Patent: Mar. 26, 2024

(54) HIGH STRAIN POINT AND HIGH YOUNG'S MODULUS GLASSES

(71) Applicant: CORNING INCORPORATED, Corning, NY (US)

(72) Inventors: Venkatesh Botu, Corning, NY (US); Xiaoju Guo, Pittsford, NY (US); Ellen Anne King, Savona, NY (US); Lisa Ann Lamberson, Painted Post, NY (US); Adama Tandia, Corning, NY (US); Kochuparambil Deenamma Vargheese, Horseheads, NY (US); Jingshi Wu, Painted Post, NY (US)

(73) Assignee: Corning Incorporated, Corning, NY (US)

(*) Notice: Subject to any disclaimer, the term of this patent is extended or adjusted under 35 U.S.C. 154(b) by 0 days.

(21) Appl. No.: 17/886,690

(22) Filed: Aug. 12, 2022

(65) Prior Publication Data

US 2022/0396518 A1 Dec. 15, 2022

Related U.S. Application Data

(62) Division of application No. 17/254,237, filed as application No. PCT/US2019/036280 on Jun. 10, 2019, now Pat. No. 11,420,897.

(60) Provisional application No. 62/686,850, filed on Jun. 19, 2018.

(51) Int. Cl.
*C03C 3/087* (2006.01)
*C03C 3/091* (2006.01)
*C03C 3/095* (2006.01)
*G02F 1/1333* (2006.01)

(52) U.S. Cl.
CPC .............. *C03C 3/087* (2013.01); *C03C 3/091* (2013.01); *C03C 3/095* (2013.01); *G02F 1/133302* (2021.01); *G02F 2202/09* (2013.01)

(58) Field of Classification Search
CPC ................... C03C 3/087; C03C 3/091
See application file for complete search history.

(56) References Cited

U.S. PATENT DOCUMENTS

| | | |
|---|---|---|
| 3,338,696 A | 8/1967 | Dockerty |
| 3,682,609 A | 8/1972 | Dockerty |
| 5,785,726 A | 7/1998 | Dorfeld et al. |
| 5,824,127 A | 10/1998 | Bange et al. |
| 6,128,924 A | 10/2000 | Bange et al. |
| 6,187,407 B1 | 2/2001 | Zou et al. |
| 7,628,038 B2 | 12/2009 | DeAngelis et al. |
| 7,628,039 B2 | 12/2009 | DeAngelis et al. |
| 7,696,113 B2 | 4/2010 | Ellison |
| 8,187,715 B2 | 5/2012 | Danielson et al. |
| 8,763,429 B2 | 7/2014 | Danielson et al. |
| 9,051,206 B2 | 6/2015 | Allan et al. |
| 9,162,919 B2 | 10/2015 | Ellison et al. |
| 9,505,650 B2 | 11/2016 | Nishizawa et al. |
| 9,919,952 B2 | 3/2018 | Allan et al. |
| 11,554,984 B2* | 1/2023 | Gross .................. C03C 15/02 |
| 2007/0191207 A1 | 8/2007 | Danielson et al. |
| 2009/0286091 A1* | 11/2009 | Danielson ............. C03C 3/095 |
| | | 501/64 |
| 2013/0037105 A1 | 2/2013 | Aitken et al. |
| 2013/0296157 A1* | 11/2013 | Ellison .................. C03C 3/093 |
| | | 501/59 |
| 2014/0049708 A1 | 2/2014 | Murata et al. |
| 2014/0179510 A1* | 6/2014 | Allan ..................... C03C 3/093 |
| | | 501/67 |
| 2014/0249017 A1 | 9/2014 | Allan et al. |
| 2015/0299028 A1 | 10/2015 | Nishizawa et al. |
| 2017/0144918 A1 | 5/2017 | Allan et al. |
| 2017/0152170 A1 | 6/2017 | Bowden et al. |
| 2017/0260086 A1* | 9/2017 | Plevacova ................ C03C 8/14 |
| 2018/0044223 A1* | 2/2018 | Hayashi ................ C03C 3/097 |
| 2020/0399166 A1 | 12/2020 | Bowden et al. |
| 2020/0407266 A1* | 12/2020 | Suzuki .................. C03C 3/091 |

FOREIGN PATENT DOCUMENTS

| | | |
|---|---|---|
| CN | 104150767 A | 11/2014 |
| CN | 107003553 A | 8/2017 |
| EP | 2315729 A1 | 5/2011 |
| JP | 09-263421 A | 10/1997 |
| JP | 2011-522767 A | 8/2011 |
| JP | 2014-503465 A | 2/2014 |
| JP | 2015-512849 A | 4/2015 |
| JP | 2016-011255 A | 1/2016 |
| WO | 2007/095115 A1 | 8/2007 |
| WO | 2009/139861 A1 | 11/2009 |
| WO | 2011/001920 A1 | 1/2011 |
| WO | 2012/077609 A1 | 6/2012 |

(Continued)

OTHER PUBLICATIONS

A. Makishima and J.D. Mackenzie, Journal of Non-Crystalline Solids, 12 35-45 (1973).
A. Makishima and J.D. Mackenzie, Journal of Non-Crystalline Solids, 17 147-157 (1975).
Indian Patent Application No. 202017055192, First Examination Report dated Jun. 29, 2022, 5 pages Original Document; Indian Patent Office.
International Search Report and Written Opinion of the International Searching Authority; PCT/US19/036280; dated Dec. 13, 2019; 17 Pages; European Patent Office.
Osborn, et al., Optimum Composition of Blast Furnace Slag as Deduced from Liquidus Data for the Quaternary System CaO—MgO—Al2O3—SiO2, Trans. Am. Inst. Min., Metall. Pet. Eng., 200 [1] 33-45 (1954).

(Continued)

Primary Examiner — Elizabeth A. Bolden
(74) Attorney, Agent, or Firm — Ryan T. Hardee

(57) ABSTRACT

Substantially alkali free glasses are disclosed with can be used to produce substrates for flat panel display devices, e.g., active-matrix liquid crystal displays (AMLCDs). The glasses have high annealing temperatures and Young's modulus. Methods for producing substantially alkali free glasses using a downdraw process (e.g., a fusion process) are also disclosed.

10 Claims, 5 Drawing Sheets

(56) References Cited

FOREIGN PATENT DOCUMENTS

| WO | 2012/103194 A1 | 8/2012 |
| WO | 2013/130695 A1 | 9/2013 |
| WO | 2016/069821 A1 | 5/2016 |
| WO | 2016/185976 A1 | 11/2016 |

OTHER PUBLICATIONS

Zhang et al., "Effects of cation field strength on structure and properties of boroaluminosilicate glasses" Received May 9, 2012, pp. 212-217.
Zou et al., "Compositional design of high modulus glasses for disk substrates", Journal of Non-Crystalline Solids 290 (2001) 180-188.
Japanese Patent Application No. 2020-571359, Office Action dated Jun. 30, 2023, 5 pages (English Translation only), Japanese Patent Office.

* cited by examiner

HIGH STRAIN POINT AND HIGH YOUNG'S MODULUS GLASSES

CROSS-REFERENCE TO RELATED APPLICATION

This application is a divisional application and claims the benefit of priority under 35 U.S.C. § 120 of U.S. application Ser. No. 17/254,237 filed on Dec. 18, 2020, which in turn, claims the benefit of priority of International Patent Application Serial No. PCT/US2019/036280, filed on Jun. 10, 2019, which in turn, claims the benefit of priority under 35 U.S.C. § 119 of U.S. Provisional Application Ser. No. 62/686,850 filed on Jun. 19, 2018, the contents of each of which are relied upon and incorporated herein by reference in their entireties.

TECHNICAL FIELD

Embodiments of the present disclosure relate to display glass. More particularly, embodiments of the present disclosure relate to display glass for active matrix liquid crystal displays.

BACKGROUND

The production of liquid crystal displays, for example, active matrix liquid crystal display devices (AMLCDs) is complex, and the properties of the substrate glass are important. First and foremost, the glass substrates used in the production of AMLCD devices need to have their physical dimensions tightly controlled. The downdraw sheet drawing processes and, in particular, the fusion process described in U.S. Pat. Nos. 3,338,696 and 3,682,609, both to Dockerty, are capable of producing glass sheets that can be used as substrates without requiring costly post-forming finishing operations such as lapping and polishing. Unfortunately, the fusion process places rather severe restrictions on the glass properties, which require relatively high liquidus viscosities.

In the liquid crystal display field, thin film transistors (TFTs) based on poly-crystalline silicon are preferred because of their ability to transport electrons more effectively. Poly-crystalline based silicon transistors (p-Si) are characterized as having a higher mobility than those based on amorphous-silicon based transistors (a-Si). This allows the manufacture of smaller and faster transistors, which ultimately produces brighter and faster displays.

One problem with p-Si based transistors is that their manufacture requires higher process temperatures than those employed in the manufacture of a-Si transistors. These temperatures range from 450° C. to 600° C. compared to the 350° C. peak temperatures employed in the manufacture of a-Si transistors. At these temperatures, most AMLCD glass substrates undergo a process known as compaction. Compaction, also referred to as thermal stability or dimensional change, is an irreversible dimensional change (shrinkage) in the glass substrate due to changes in the glass fictive temperature. "Fictive temperature" is a concept used to indicate the structural state of a glass. Glass that is cooled quickly from a high temperature is said to have a higher fictive temperature because of the "frozen in" higher temperature structure. Glass that is cooled more slowly, or that is annealed by holding for a time near its annealing point, is said to have a lower fictive temperature.

The magnitude of compaction depends both on the process by which a glass is made and the viscoelastic properties of the glass. In the float process for producing sheet products from glass, the glass sheet is cooled relatively slowly from the melt and, thus, "freezes in" a comparatively low temperature structure into the glass. The fusion process, by contrast, results in very rapid quenching of the glass sheet from the melt, and freezes in a comparatively high temperature structure. As a result, a glass produced by the float process may undergo less compaction when compared to glass produced by the fusion process, since the driving force for compaction is the difference between the fictive temperature and the process temperature experienced by the glass during compaction. Thus, it would be desirable to minimize the level of compaction in a glass substrate that is produced by a fusion process as well as other forming processes (e.g., float).

There are two approaches to minimize compaction in glass. The first is to thermally pretreat the glass to create a fictive temperature similar to the one the glass will experience during the p-Si TFT manufacture. There are several difficulties with this approach. First, the multiple heating steps employed during the p-Si TFT manufacture create slightly different fictive temperatures in the glass that cannot be fully compensated for by this pretreatment. Second, the thermal stability of the glass becomes closely linked to the details of the p-Si TFT manufacture, which could mean different pretreatments for different end-users. Finally, pretreatment adds to processing costs and complexity.

Another approach is to slow the rate of strain at the process temperature by increasing the viscosity of the glass. This can be accomplished by raising the viscosity of the glass. The annealing point represents the temperature corresponding to a fixed viscosity for a glass, and thus an increase in annealing point equates to an increase in viscosity at fixed temperature. The challenge with this approach, however, is the production of high annealing point glass that is cost effective. The main factors impacting cost are defects and asset lifetime. In a modern melter coupled to a fusion draw machine, four types of defects are commonly encountered: (1) gaseous inclusions (bubbles or blisters); (2) solid inclusions from refractories or from failure to properly melt the batch; (3) metallic defects consisting largely of platinum; and (4) devitrification products resulting from low liquidus viscosity or excessive devitrification at either end of the isopipe. Glass composition has a disproportionate impact on the rate of melting, and hence on the tendency of a glass to form gaseous or solid defects, and the oxidation state of the glass impacts the tendency to incorporate platinum defects. Devitrification of the glass on the forming mandrel or isopipe, can best be managed by selecting compositions with high liquidus viscosities.

Asset lifetime is determined mostly by the rate of wear or deformation of the various refractory and precious metal components of the melting and forming systems. Recent advances in refractory materials, platinum system design, and isopipe refractories have offered the potential to greatly extend the useful operational lifetime of a melter coupled to a fusion draw machine. As a result, the lifetime-limiting component of a modern fusion draw melting and forming platform is the electrodes used to heat the glass. Tin oxide electrodes corrode slowly over time, and the rate of corrosion is a strong function both of temperature and glass composition. To maximize asset lifetime, it is desirable to identify compositions that reduce the rate of electrode corrosion while maintaining the defect-limiting attributes described above.

As long as the compaction of a glass is below a threshold level, a significant attribute determining the suitability of a glass as a substrate is the variability, or lack thereof, in total pitch of the substrate during the manufacture of the TFT which can cause misalignment of the components of the TFT and result in bad pixels in the final display. This variability is most significantly due to variations in the compaction of the glass, variations in the elastic distortions of the glass under stress applied by the films deposited during the TFT manufacture, and variations in the relaxation of those same stresses during the TFT manufacturing. A glass possessing high dimensional stability will have reduced variability of compaction as well as reduced stress relaxation, and a glass with a high Young's modulus will help reduce the distortions due to film stress. Consequently, a glass possessing both a high modulus and high dimensional stability will minimize total pitch variability during the TFT process, making it an advantaged substrate for these applications.

Furthermore, glasses having a high strain point and high Young's modulus glasses may also find use as a flexible organic light-emitting diode (OLED) carrier and as a substrate for hard drive disk made from heat-assisted magnetic recording (HAMR) technology.

Accordingly, there is a need in the art for glass compositions with a high Modulus and high dimensional stability while having other advantageous properties and characteristics.

SUMMARY OF THE CLAIMS

One or more embodiments of the present disclosure are directed to glass comprising, in mole percent on an oxide basis in the ranges: $SiO_2$ 65-75%, $Al_2O_3$ 12-14%, $B_2O_3$ 0-3%, MgO 4-8%, CaO 5-10%, SrO 0-5% and other oxides including $Y_2O_3$, $ZrO_2$, ZnO 0-2%. In additional embodiments, the glass comprises in mole percent on an oxide basis in the ranges: $SiO_2$ 69-73%, $Al_2O_3$ 12-14%, $B_2O_3$ 0-3%, MgO 4-7%, CaO 5-6%, SrO 3-4% and other oxides including $Y_2O_3$, $ZrO_2$, ZnO 0-1% and has a strain point greater than 760° C., a 200 poise temperature less than 1650° C., a liquidus temperature below 1300° C., a liquidus viscosity greater than 20,000 Poise, a Young's modulus greater than 85 GPa, and/or a specific modulus greater than 33 GPa/g/cm$^3$.

Exemplary glasses may be in the MgO—CaO—SrO—$Al_2O_3$—$SiO_2$ system plus a small amount of $Y_2O_3$, $ZrO_2$, ZnO, to provide a strain point of 780° C., a liquidus viscosity of greater than 68,000 Poise, and a 200 Poise (or typical melting temperature) of 1650° C. to offer higher strain point, energy savings during melting and provide an extended melting tank life, all of which contribute to significant cost savings. Additional glasses may be in the MgO—CaO—SrO—BaO—B2O3-$Al_2O_3$—$SiO_2$ system and provide a strain point of 757° C. or greater, a liquidus viscosity of greater than 62,400 Poise, a specific modulus of greater than 32.18, a Young's modulus of greater than 83.56 GPa.

One or more embodiments of the present disclosure are directed to glass comprising, in mole percent on an oxide basis in the ranges: 69-74% $SiO_2$, 11-14% $Al_2O_3$, 0-3% $B_2O_3$, 4-7% MgO, 5-7% CaO, 0-3% SrO and 1-5% BaO. Additional embodiments of the present disclosure are directed to glass comprising, in mole percent on an oxide basis in the ranges: 70-73% $SiO_2$, 11-13% $Al_2O_3$, 0-1% $B_2O_3$, 4-7% MgO, 5-7% CaO, 0-3% SrO and 1-5% BaO with strain points greater than 752° C., liquidus temperatures below 1300° C., liquidus viscosities greater than 20,000 Poise, Young's modulus greater than 83.56 GPa, and/or specific modulus greater than 32 GPa/g/cm$^3$.

One or more embodiments of the present disclosure are directed to glass comprising, in mole percent on an oxide basis in the ranges: 68.84-74.07% $SiO_2$, 10.41-14.87% $Al_2O_3$, 0-2% $B_2O_3$, 3.44-7.45% MgO, 4.19-8.23% CaO, 0-3.36% SrO, 0.91-5.59% BaO, and 0.09-0.2% $SnO_2$. Additional embodiments of the present disclosure are directed to glass comprising, in mole percent on an oxide basis in the ranges: 69.86-72.13% $SiO_2$, 11.58-13.01% $Al_2O_3$, 0-1% $B_2O_3$, 4.44-6.45% MgO, 5.53-7.23% CaO, 0.09-1.67% SrO, 2.92-4.57% BaO, and 0.09-0.1% $SnO_2$.

Additional embodiments of the disclosure are directed to an object comprising the glass produced by a downdraw sheet fabrication process. Further embodiments are directed to glass produced by the fusion process or variants thereof.

BRIEF DESCRIPTION OF THE DRAWINGS

The accompanying figures, which are incorporated in and constitute a part of this specification, illustrate several embodiments described below.

DETAILED DESCRIPTION

Figure 1:
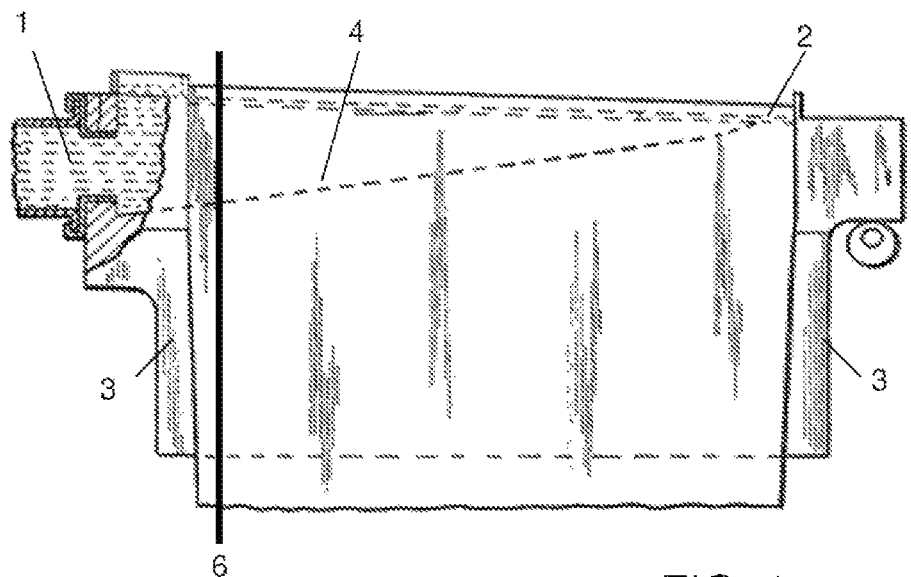
FIG. 1 shows a schematic representation of a forming mandrel used to make precision sheet in the fusion draw process.

Described herein are alkali-free glasses and methods for making the same that possess high annealing and/or strain points and high Young's moduli, allowing the glasses to possess excellent dimensional stability (i.e., low compaction) during the manufacture of TFTs, reducing variability during the TFT process. Glass with high annealing and/or strain points can help prevent panel distortion due to compaction/shrinkage during thermal processing subsequent to manufacturing of the glass. Additionally, some embodiments of the present disclosure have high liquidus viscosities, thus reducing or eliminating the likelihood of devitrification on the relatively cold forming mandrel. As a result of specific details of their composition, exemplary glasses melt to good quality with very low levels of gaseous inclusions, and with minimal erosion to precious metals, refractories, and tin oxide electrode materials.

In one embodiment, the substantially alkali-free glasses can have high annealing points. In some embodiments, the annealing point is greater than about 790° C., 795° C., 800° C. or 805° C. Without being bound by any particular theory of operation, it is believed that such high annealing points result in low rates of relaxation—and hence comparatively small amounts of compaction—for exemplary glasses to be used as backplane substrate in a low-temperature polysilicon process.

The liquidus temperature of a glass ($T_{liq}$) is the temperature above which no crystalline phases can coexist in equilibrium with the glass. In various embodiments, a glass articles has a $T_{liq}$ in the range of about 1200° C. to about 1350° C., or in the range of about 1220° C. to about 1325° C. In another embodiment, the viscosity corresponding to the liquidus temperature of the glass is greater than or equal to about 150,000 poise. In some embodiments, the viscosity corresponding to the liquidus temperature of the glass is greater than or equal to about 175,000 poise, 200,000 poise, 225,000 poise or 250,000 poise.

In another embodiment, an exemplary glass can provide $T_{35k}-T_{liq}>0.25T_{35k}-225°$ C. This ensures minimum tendency to devitrify on the forming mandrel of the fusion process.

In one embodiment, the glass includes a chemical fining agent. Such fining agents include, but are not limited to, $SnO_2$, $As_2O_3$, $Sb_2O_3$, F, Cl and Br, and in which the concentrations of the chemical fining agents are kept at a level of 0.5 mol % or less. In some embodiments, the chemical fining agent comprises one or more of $SnO_2$, $As_2O_3$, $Sb_2O_3$, F, Cl or Br in a concentration less than or equal to about 0.5 mol %, 0.45 mol %, 0.4 mol %, 0.35 mol %, 0.3 mol % or 0.25 mol %. Chemical fining agents may also include $CeO_2$, $Fe_2O_3$, and other oxides of transition metals, such as $MnO_2$. These oxides may introduce color to the glass via visible absorptions in their final valence state(s) in the glass, and thus their concentration may be at a level of 0.2 mol % or less. In one or more embodiments, the glass composition comprises one or more oxides of transition metals in a concentration less than or equal to about 0.2 mol %, 0.15 mol %, 0.1 mol % or 0.05 mol %. In some embodiments, the glass composition comprises in the range of about 0.01 mol % to about 0.4 mol % of any one or combination of $SnO_2$, $As_2O_3$, $Sb_2O_3$, F, Cl and/or Br. In specific embodiments, the glass composition comprises in the range of about 0.005 mol % to about 0.2 mol % of any one or combination of $Fe_2O_3$, $CeO_2$ and/or $MnO_2$. In some embodiments, $As_2O_3$ and $Sb_2O_3$ comprises less than or equal to about 0.005 mol % of the glass composition.

Figure 2:
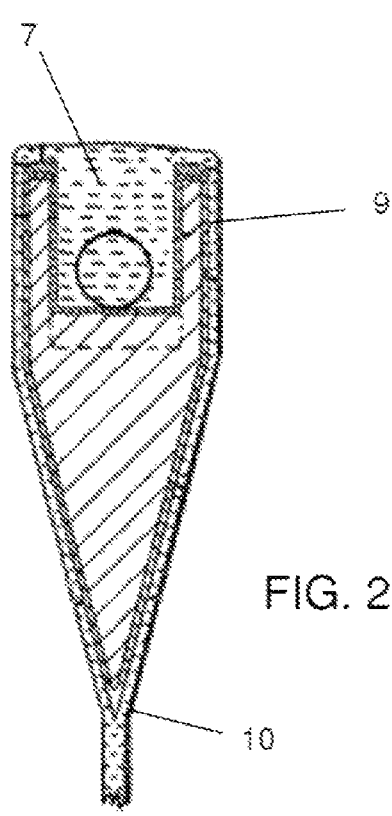
FIG. 2 shows a cross-sectional view of the forming mandrel of FIG. 1 taken along position 6.

In one embodiment, exemplary glasses are manufactured into sheet via the fusion process. The fusion draw process may result in a pristine, fire-polished glass surface that reduces surface-mediated distortion to high resolution TFT backplanes and color filters. FIG. 1 is a schematic drawing of a forming mandrel, or isopipe, in a non-limiting fusion draw process. FIG. 2 is a schematic cross-section of the isopipe near position 6 in FIG. 1. Glass is introduced from the inlet 1, flows along the bottom of the trough 4 formed by the weir walls 9 to the compression end 2. Glass overflows the weir walls 9 on either side of the isopipe (see FIG. 2), and the two streams of glass join or fuse at the root 10. Edge directors 3 at either end of the isopipe serve to cool the glass and create a thicker strip at the edge called a bead. The bead is pulled down by pulling rolls, hence enabling sheet formation at high viscosity. By adjusting the rate at which sheet is pulled off the isopipe, it is possible to use the fusion draw process to produce a very wide range of thicknesses at a fixed melting rate.

The downdraw sheet drawing processes and, in particular, the fusion process described in U.S. Pat. Nos. 3,338,696 and 3,682,609 (both to Dockerty), which are incorporated by reference, can be used herein. Without being bound by any particular theory of operation, it is believed that the fusion process can produce glass substrates that do not require polishing. Current glass substrate polishing is capable of producing glass substrates having an average surface roughness greater than about 0.5 nm (Ra), as measured by atomic force microscopy. The glass substrates produced by the fusion process have an average surface roughness as measured by atomic force microscopy of less than 0.5 nm. The substrates also have an average internal stress as measured by optical retardation which is less than or equal to 150 psi. Of course, the claims appended herewith should not be so limited to fusion processes as embodiments described herein are equally applicable to other forming processes such as, but not limited to, float forming processes.

In one embodiment, exemplary glasses are manufactured into sheet form using the fusion process. While exemplary glasses are compatible with the fusion process, they may also be manufactured into sheets or other ware through different manufacturing processes. Such processes include slot draw, float, rolling, and other sheet-forming processes known to those skilled in the art.

Relative to these alternative methods for creating sheets of glass, the fusion process as discussed above is capable of creating very thin, very flat, very uniform sheets with a pristine surface. Slot draw also can result in a pristine surface, but due to change in orifice shape over time, accumulation of volatile debris at the orifice-glass interface, and the challenge of creating an orifice to deliver truly flat glass, the dimensional uniformity and surface quality of slot-drawn glass are generally inferior to fusion-drawn glass. The float process is capable of delivering very large, uniform sheets, but the surface is substantially compromised by contact with the float bath on one side, and by exposure to condensation products from the float bath on the other side. This means that float glass must be polished for use in high performance display applications.

The fusion process may involve rapid cooling of the glass from high temperature, resulting in a high fictive temperature $T_f$. The fictive temperature can be thought of as representing the discrepancy between the structural state of the glass and the state it would assume if fully relaxed at the temperature of interest. Reheating a glass with a glass transition temperature $T_g$ to a process temperature $T_p$ such that $T_p<T_g\leq T_f$ may be affected by the viscosity of the glass. Since $T_p<T_f$, the structural state of the glass is out of equilibrium at $T_p$, and the glass will spontaneously relax toward a structural state that is in equilibrium at $T_p$. The rate of this relaxation scales inversely with the effective viscosity of the glass at $T_p$, such that high viscosity results in a slow rate of relaxation, and a low viscosity results in a fast rate of relaxation. The effective viscosity varies inversely with the fictive temperature of the glass, such that a low fictive temperature results in a high viscosity, and a high fictive temperature results in a comparatively low viscosity. Therefore, the rate of relaxation at $T_p$ scales directly with the fictive temperature of the glass. A process that introduces a high fictive temperature results in a comparatively high rate of relaxation when the glass is reheated at $T_p$.

One means to reduce the rate of relaxation at $T_p$ is to increase the viscosity of the glass at that temperature. The annealing point of a glass represents the temperature at which the glass has a viscosity of $10^{13.2}$ poise. As temperature decreases below the annealing point, the viscosity of the supercooled melt increases. At a fixed temperature below $T_g$, a glass with a higher annealing point has a higher viscosity than a glass with a lower annealing point. Therefore, increasing the annealing point may increase the viscosity of a substrate glass at $T_p$. Generally, the composition changes necessary to increase the annealing point also increase viscosity at all other temperatures. In a non-limiting embodiment, the fictive temperature of a glass made by the fusion process corresponds to a viscosity of about $10^{11}$-$10^{12}$ poise, so an increase in annealing point for a fusion-compatible glass generally increases its fictive temperature as well. For a given glass regardless of the forming process, higher fictive temperature results in lower viscosity at temperature below $T_g$, and thus increasing fictive temperature works against the viscosity increase that would otherwise be obtained by increasing the annealing point. To have a substantial change in the rate of relaxation at $T_p$, it is generally necessary to make relatively large changes in the annealing point. An aspect of exemplary glasses is that it has an annealing point greater than or equal to about 790° C., 795° C., 800° C. or 805° C. Without being bound by any particular theory of operation, it is believed that such high annealing points results in acceptably low rates of thermal relaxation during low-temperature TFT processing, e.g., typical low-temperature polysilicon rapid thermal anneal cycles.

In addition to its impact on fictive temperature, increasing annealing point also increases temperatures throughout the melting and forming system, particularly the temperatures on the isopipe. For example, Eagle XG® glass and Lotus™ glass (Corning Incorporated, Corning, NY) have annealing points that differ by about 50° C., and the temperature at which they are delivered to the isopipe also differ by about 50° C. When held for extended periods of time above about 1310° C., zircon refractory forming the isopipe shows thermal creep, which can be accelerated by the weight of the isopipe itself plus the weight of the glass on the isopipe. A second aspect of exemplary glasses is that their delivery temperatures are less than or equal to about 1350° C., or 1345° C., or 1340° C., or 1335° C., or 1330° C., or 1325° C., or 1320° C., or 1315° C. or 1310° C. Such delivery temperatures may permit extended manufacturing campaigns without a need to replace the isopipe or extend the time between isopipe replacements.

In manufacturing trials of glasses with high annealing points and delivery temperatures below 1350° C. and below 1310° C., it has been found that the glass showed a greater tendency toward devitrification on the root of the isopipe and—especially—the edge directors relative to glasses with lower annealing points. Careful measurement of the temperature profile on the isoipe showed that the edge director temperatures were much lower relative to the center root temperature than had been anticipated and is believed to be due to radiative heat loss. The edge directors typically are maintained at a temperature below the center root temperature to ensure that the glass is viscous enough as it leaves the root to put the sheet in between the edge directors under tension, thus maintaining a flat shape. As edge directors are located at either end of the isopipe, the edge directors are difficult to heat, and thus the temperature difference between the center of the root and the edge directors may differ by 50° or more.

Figure 3:
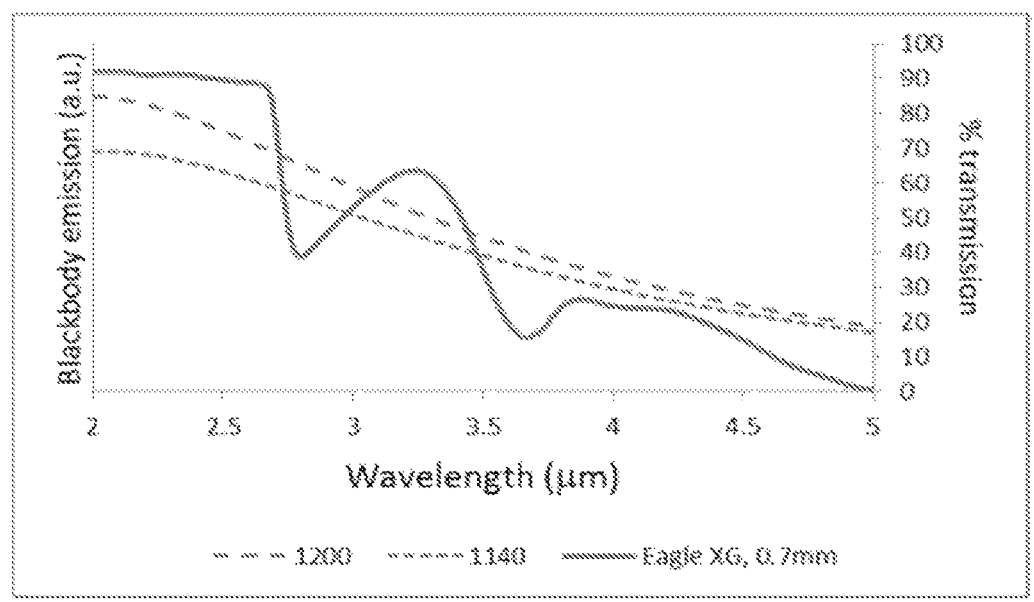
FIG. 3 is a graph of spectra for 1200° and 1140° C. blackbodies and the transmission spectrum of 0.7 mm thick Eagle XG® amorphous thin-film transistor substrate.

While not wishing to be held to theory, it is believed that the increased tendency toward devitirication in the fusion process can be understood in terms of the radiative heat loss of glass as a function of temperature. Fusion is substantially an isothermal process, so glass exits the inlet at a particular viscosity and exits the root at a much higher viscosity, but the actual values for the viscosity are not strongly dependent on the identity of the glass or the temperature of the process. Thus, a glass with a higher annealing point generally requires much higher isopipe temperatures than a glass with a lower annealing point just to match the delivery and exit viscosities. As an example, FIG. 3 shows blackbody spectra corresponding to 1140° C. and 1200° C., approximately the temperature at the root of the isopipe (10 in FIG. 2) for Eagle XG® glass and Lotus™ glass, respectively. The vertical line at about 2.5 µm corresponds approximately with the start of the infrared cut-off, the region in the near infrared through which optical absorption in a borosilicate glass rises very steeply to a high, nearly constant value. At wavelengths shorter than the cut-off wavelength, a glass is sensibly transparent to a wavelength between 300 and 400 nm, the UV cut-off. Between about 300 nm and about 2.5 µm, the 1200° C. blackbody has a greater absolute energy, and a larger fraction of its total energy than the 1140° C. blackbody. Since the glass is sensibly transparent through this wavelength range, the radiative heat loss from a glass at 1200° C. is much greater than that of a glass at 1140° C.

Again, without being bound by any particular theory of operation, it is believed that since radiative heat loss increases with temperature, and since high annealing point glasses generally are formed at higher temperatures than lower annealing point glasses, the temperature difference between the center root and the edge director generally increases with the annealing point of the glass. This may have a direct relationship to the tendency of a glass to form devitrification products on the isopipe or edge directors.

The liquidus temperature of a glass is defined as the highest temperature at which a crystalline phase would appear if a glass were held indefinitely at that temperature. The liquidus viscosity is the viscosity of a glass at the liquidus temperature. To completely avoid devitrification on an isopipe, it may be helpful for the liquidus viscosity to be high enough to ensure that glass is no longer on the isopipe refractory or edge director material at or near the liquidus temperature.

In practice, few alkali-free glasses have liquidus viscosities of the desired magnitude. Experience with substrate glasses suitable for amorphous silicon applications (e.g., Eagle XG® glass) indicated that edge directors could be held continuously at temperatures up to 60° below the liquidus temperature of certain alkali-free glasses. While it was understood that glasses with higher annealing points would require higher forming temperatures, it was not anticipated that the edge directors would be so much cooler relative to the center root temperature. A useful metric for keeping track of this effect is the difference between the delivery temperature onto the isopipe and the liquidus temperature of the glass, $T_{liq}$. In the fusion process, it is generally desirable to deliver glass at about 35,000 poise ($T_{35k}$). For a particular delivery temperature, it may be useful to make $T_{35k}$-$T_{liq}$ as large possible, but for an amorphous silicon substrate such as Eagle XG® glass, it is found that extended manufacturing campaigns can be conducted if $T_{35k}$-$T_{liq}$ is about 80° or more. As temperature increases, $T_{35k}$-$T_{liq}$ must increase as well, such that for $T_{35k}$ near 1300° C., it may be helpful to have $T_{35k}$-$T_{liq}$ equal to or greater than about 100° C. The minimum useful value for $T_{35k}$-$T_{liq}$ varies approximately linearly with temperature from about 1200° C. to about 1320° C., and can be expressed according to equation (1).

$$\text{Minimum } T_{35k}-T_{liq}=0.25T_{35k}-225, \quad (1)$$

where all temperatures are in ° C. Thus, one or more embodiments of exemplary glasses has a $T_{35k}$-$T_{liq}$>0.25$T_{35k}$-225° C.

In addition, the forming process may require glass with a high liquidus viscosity. This is necessary so as to avoid devitrification products at interfaces with glass and to minimize visible devitrification products in the final glass. Thus, for a given glass compatible with fusion for a particular sheet size and thickness, adjusting the process so as to manufacture wider sheet or thicker sheet generally results in lower temperatures at either end of the isopipe. Some embodiments have higher liquidus viscosities to provide greater flexibility for manufacturing via the fusion process. In some embodiments, the liquidus viscosity is greater than or equal to about 150 kP.

In tests of the relationship between liquidus viscosity and subsequent devitrification tendencies in the fusion process, the inventors have surprisingly found that high delivery temperatures, such as those of exemplary glasses, generally require higher liquidus viscosities for long-term production than would be the case for typical AMLCD substrate compositions with lower annealing points. While not wishing to be bound by theory, it is believed that this arises from accelerated rates of crystal growth as temperature increases. Fusion is essentially an isoviscous process, so a more viscous glass at some fixed temperature may be formed by fusion at higher temperature than a less viscous glass. While some degree of undercooling (cooling below the liquidus temperature) can be sustained for extended periods in a glass at lower temperature, crystal growth rates increase with temperature, and thus more viscous glasses grow an equivalent, unacceptable amount of devitrification products in a shorter period of time than less viscous glasses. Depending on where formed, devitrification products can compromise forming stability and introduce visible defects into the final glass.

To be formed by the fusion process, one or more embodiments of the glass compositions have a liquidus viscosity greater than or equal to about 150,000 poises, or 175,000 poises, or 200,000 poises. A surprising result is that throughout the range of exemplary glasses, it is possible to obtain a liquidus temperature low enough, and a viscosity high enough, such that the liquidus viscosity of the glass is unusually high compared to other compositions.

In the glass compositions described herein, $SiO_2$ serves as the basic glass former. In certain embodiments, the concentration of $SiO_2$ can be greater than 60 mole percent to provide the glass with a density and chemical durability suitable for a flat panel display glass (e.g., an AMLCD glass), and a liquidus temperature (liquidus viscosity), which allows the glass to be formed by a downdraw process (e.g., a fusion process). In terms of an upper limit, in general, the $SiO_2$ concentration can be less than or equal to about 80 mole percent to allow batch materials to be melted using conventional, high volume, melting techniques, e.g., Joule melting in a refractory melter. As the concentration of $SiO_2$ increases, the 200 Poise temperature (melting temperature) generally rises. In various applications, the $SiO_2$ concentration is adjusted so that the glass composition has a melting temperature less than or equal to 1,750° C. In some embodiments, the $SiO_2$ concentration is in the range of about 65 mol % to about 75 mol %, or in the range of about 69 mol % to about 73 mol %, or in the range of about 69 mol % to about 74 mol % or in the range of about 70 mol % and 73 mol %, or in the range of about 68.84 to 74.07 mol %, or in the range of about 69.86 mol % to about 72.13 mol %.

$Al_2O_3$ is another glass former used to make the glasses described herein. An $Al_2O_3$ concentration greater than or equal to 10 mole percent provides the glass with a low liquidus temperature and high viscosity, resulting in a high liquidus viscosity. The use of at least 10 mole percent $Al_2O_3$ also improves the glass's annealing point and modulus. In order that the ratio $(MgO+CaO+SrO+BaO)/Al_2O_3$ is greater than or equal to 1.0, the $Al_2O_3$ concentration may be below about 15 mole percent. In some embodiments, the $Al_2O_3$ concentration is in the range of about 12 and 14 mole percent, or in the range of about 11 to about 14 mol %, or in the range of about 11 mol % to about 13 mol %, or in the range of about 10.41 mol % to about 14.07 mol %, or in the range of about 11.58 mol % to about 13.01 mol %. In some embodiments, the $Al_2O_3$ concentration is greater than or equal to about 10.0 mol %, 10.5 mol %, 11.0 mol %, 11.5 mol %, 12.0 mol %, 12.5 mol % or 13.0 mol % while maintaining a ratio of $(MgO+CaO+SrO+BaO)/Al_2O_3$ greater than or equal to about 1.0.

Some embodiments of the disclosure have a modulus greater than about 83 GPa, or 83.5 GPa, or 84 GPa, or 84.5 GPa or 85 GPa.

The density of some embodiments of aluminosilicate glass articles is less than about 2.7 g/cc, or 2.65 g/cc, or 2.61 g/cc. In various embodiments, the density is in the range of about 2.48 g/cc to about 2.65 g/cc.

$B_2O_3$ is both a glass former and a flux that aids melting and lowers the melting temperature. It has an impact on both liquidus temperature and viscosity. Increasing $B_2O_3$ can be used to increase the liquidus viscosity of a glass. To achieve these effects, the glass compositions of one or more embodiments may have $B_2O_3$ concentrations that are equal to or greater than 0.01 mole percent. As discussed above with regard to $SiO_2$, glass durability is very important for LCD applications. Durability can be controlled somewhat by elevated concentrations of alkaline earth oxides, and significantly reduced by elevated $B_2O_3$ content. Annealing point decreases as $B_2O_3$ increases, so it may be helpful to keep $B_2O_3$ content low relative to its typical concentration in amorphous silicon substrates. Thus in some embodiments, the glass composition has $B_2O_3$ concentrations that are in the range of about 0.0 and 3 mole percent, or greater than 0 to about 3 mol %, or about 0.0 to about 1 mol %, or about 0 to about 2 mol %.

The $Al_2O_3$ and $B_2O_3$ concentrations can be selected as a pair to increase annealing point, increase modulus, improve durability, reduce density, and reduce the coefficient of thermal expansion (CTE), while maintaining the melting and forming properties of the glass.

For example, an increase in $B_2O_3$ and a corresponding decrease in $Al_2O_3$ can be helpful in obtaining a lower density and CTE, while an increase in $Al_2O_3$ and a corresponding decrease in $B_2O_3$ can be helpful in increasing annealing point, modulus, and durability, provided that the increase in $Al_2O_3$ does not reduce the $(MgO+CaO+SrO+BaO)/Al_2O_3$ ratio below about 1.0. For $(MgO+CaO+SrO+BaO)/Al_2O_3$ ratios below about 1.0, it may be difficult or impossible to remove gaseous inclusions from the glass due to late-stage melting of the silica raw material. Furthermore, when $(MgO+CaO+SrO+BaO)/Al_2O_3 \leq 1.05$, mullite, an aluminosilicate crystal, can appear as a liquidus phase. Once mullite is present as a liquidus phase, the composition sensitivity of liquidus increases considerably, and mullite devitrification products both grow very quickly and are very difficult to remove once established. Thus, in some embodiments, the glass composition has $(MgO+CaO+SrO+BaO)/Al_2O_3 \geq 1.0$ (or greater than or equal to about 1.0). In various embodiments, the glass has $(MgO+CaO+SrO+BaO)/Al_2O_3 \geq 1.05$ (or greater than or equal to about 1.05), or in the range of about 1 to about 1.25.

In one or more embodiments, glasses for use in AMLCD applications have coefficients of thermal expansion (CTEs) (22-300° C.) in the range of about 3.0 ppm to about 4.0 ppm, or in the range of about 3.2 ppm to 3.9 ppm, or in the range of about 3.23 ppm to about 3.88 ppm.

In addition to the glass formers ($SiO_2$, $Al_2O_3$, and $B_2O_3$), the glasses described herein also include alkaline earth oxides. In one embodiment, at least three alkaline earth oxides are part of the glass composition, e.g., MgO, CaO, and BaO, and, optionally, SrO. The alkaline earth oxides provide the glass with various properties important to melting, fining, forming, and ultimate use. Accordingly, to improve glass performance in these regards, in one embodiment, the (MgO+CaO+SrO+BaO)/Al$_2$O$_3$ ratio is greater than or equal to about 1.0. As this ratio increases, viscosity tends to increase more strongly than liquidus temperature, and thus it is increasingly difficult to obtain suitably high values for $T_{35k}$–$T_{liq}$. Thus in another embodiment, ratio (MgO+CaO+SrO+BaO)/Al$_2$O$_3$ is less than or equal to about 2. In some embodiments, the (MgO+CaO+SrO+BaO)/Al$_2$O$_3$ ratio is in the range of about 1 to about 1.2, or in the range of about 1 to about 1.16, or in the range of about 1.1 to about 1.6. In detailed embodiments, the (MgO+CaO+SrO+BaO)/Al$_2$O$_3$ ratio less than about 1.7, or 1.6, or 1.5.

For certain embodiments of this disclosure, the alkaline earth oxides may be treated as what is in effect a single compositional component. This is because their impact upon viscoelastic properties, liquidus temperatures and liquidus phase relationships are qualitatively more similar to one another than they are to the glass forming oxides SiO$_2$, Al$_2$O$_3$ and B$_2$O$_3$. However, the alkaline earth oxides CaO, SrO and BaO can form feldspar minerals, notably anorthite (CaAl$_2$Si$_2$O$_8$) and celsian (BaAl$_2$Si$_2$O$_8$) and strontium-bearing solid solutions of same, but MgO does not participate in these crystals to a significant degree. Therefore, when a feldspar crystal is already the liquidus phase, a superaddition of MgO may serves to stabilize the liquid relative to the crystal and thus lower the liquidus temperature. At the same time, the viscosity curve typically becomes steeper, reducing melting temperatures while having little or no impact on low-temperature viscosities.

The inventors have found that the addition of small amounts of MgO may benefit melting by reducing melting temperatures, forming by reducing liquidus temperatures and increasing liquidus viscosity, while preserving high annealing point and, thus, low compaction. In various embodiments, the glass composition comprises MgO in an amount in the range of about 4 mol % to about 8 mol %, or in the range of about 4 mol % to about 7 mol %, or in the range of about 3.44 mol % to about 7.45 mol %, or in the range of about 4.44 mol % to about 6.45 mol %.

The inventors have surprisingly found that glasses with suitably high values of $T_{35k}$–$T_{liq}$, the ratio of MgO to the other alkaline earths, MgO/(MgO+CaO+SrO+BaO), falls within a relatively narrow range. As noted above, additions of MgO can destabilize feldspar minerals, and thus stabilize the liquid and lower liquidus temperature. However, once MgO reaches a certain level, mullite, Al$_6$Si$_2$O$_{13}$, may be stabilized, thus increasing the liquidus temperature and reducing the liquidus viscosity. Moreover, higher concentrations of MgO tend to decrease the viscosity of the liquid, and thus even if the liquidus viscosity remains unchanged by addition of MgO, it will eventually be the case that the liquidus viscosity will decrease. Thus in another embodiment, 0.20≤MgO/(MgO+CaO+SrO+BaO)≤0.40 or in some embodiments, 0.22≤MgO/(MgO+CaO+SrO+BaO)≤0.37. Within these ranges, MgO may be varied relative to the glass formers and the other alkaline earth oxides to maximize the value of $T_{35k}$–$T_{liq}$ consistent with obtaining other desired properties.

Without being bound by any particular theory of operation, it is believed that calcium oxide present in the glass composition can produce low liquidus temperatures (high liquidus viscosities), high annealing points and moduli, and CTE's in the most desired ranges for flat panel applications, specifically, AMLCD applications. It also contributes favorably to chemical durability, and compared to other alkaline earth oxides, it is relatively inexpensive as a batch material. However, at high concentrations, CaO increases the density and CTE. Furthermore, at sufficiently low SiO$_2$ concentrations, CaO may stabilize anorthite, thus decreasing liquidus viscosity. Accordingly, in one or more embodiment, the CaO concentration can be greater than or equal to 4.0 mol %. In various embodiments, the CaO concentration of the glass composition is in the range of about 5 mol % to about 10 mol %, or in the range of about 5 mol % to about 6 mol %, or in the range of about 5 mol % to about 7 mol %, or in the range of about 4.19 mol % to about 8.23 mol %, or in the range of about 5.53 mol % to about 7.23 mol %.

SrO and BaO can both contribute to low liquidus temperatures (high liquidus viscosities) and, thus, the glasses described herein will typically contain at least both of these oxides. However, the selection and concentration of these oxides are selected to avoid an increase in CTE and density and a decrease in modulus and annealing point. The relative proportions of SrO and BaO can be balanced so as to obtain a suitable combination of physical properties and liquidus viscosity such that the glass can be formed by a downdraw process. In various embodiments, the glass comprises SrO in the range of about 0 to about 5 mol %, or about 3 to about 4 mol %, or greater than 0 to about 3 mol %, or in the range of about 0 mol % to about 3.36 mol %, or in the range of about 0.09 mol % to about 1.67 mol %. In one or more embodiments, the glass comprises BaO in the range of about 0 to about 5 mol %, or from 1 to about 5 mol %, or about 0.91 to about 5.59 mol %, or about 2.92 mol % to about 4.57 mol %.

To summarize the effects/roles of the central components of the glasses of the disclosure, SiO$_2$ is the basic glass former. Al$_2$O$_3$ and B$_2$O$_3$ are also glass formers and can be selected as a pair with, for example, an increase in B$_2$O$_3$ and a corresponding decrease in Al$_2$O$_3$ being used to obtain a lower density and CTE, while an increase in Al$_2$O$_3$ and a corresponding decrease in B$_2$O$_3$ being used in increasing annealing point, modulus, and durability, provided that the increase in Al$_2$O$_3$ does not reduce the RO/Al$_2$O$_3$ ratio below about 1.0, where RO=(MgO+CaO+SrO+BaO). If the ratio goes too low, meltability is compromised, i.e., the melting temperature becomes too high. B$_2$O$_3$ can be used to bring the melting temperature down, but high levels of B$_2$O$_3$ compromise annealing point.

In addition to meltability and annealing point considerations, for AMLCD applications, the CTE of the glass should be compatible with that of silicon. To achieve such CTE values, exemplary glasses can control the RO content of the glass. For a given Al$_2$O$_3$ content, controlling the RO content corresponds to controlling the RO/Al$_2$O$_3$ ratio. In practice, glasses having suitable CTE's are produced if the RO/Al$_2$O$_3$ ratio is below about 1.6.

On top of these considerations, the glasses are preferably formable by a downdraw process, e.g., a fusion process, which means that the glass' liquidus viscosity needs to be relatively high. Individual alkaline earths play an important role in this regard since they can destabilize the crystalline phases that would otherwise form. BaO and SrO are particularly effective in controlling the liquidus viscosity and are included in exemplary glasses for at least this purpose. As illustrated in the examples presented below, various combinations of the alkaline earths will produce glasses having high liquidus viscosities, with the total of the alkaline earths satisfying the RO/Al$_2$O$_3$ ratio constraints needed to achieve low melting temperatures, high annealing points, and suitable CTE's. In some embodiments, the liquidus viscosity is greater than or equal to about 150 kP.

In addition to the above components, the glass compositions described herein can include various other oxides to adjust various physical, melting, fining, and forming attributes of the glasses. Examples of such other oxides include, but are not limited to, $TiO_2$, MnO, $Fe_2O_3$, ZnO, $Nb_2O_5$, $MoO_3$, $Ta_2O_5$, $WO_3$, $Y_2O_3$, $La_2O_3$ and $CeO_2$ as well as other rare earth oxides and phosphates. In one embodiment, the amount of each of these oxides can be less than or equal to 2.0 mole percent, and their total combined concentration can be less than or equal to 5.0 mole percent. In some embodiments, the glass composition comprises ZnO, $Y_2O_3$, and/or $ZrO_2$, in an amount in the range of about 0 to about 2 mol %, or about 0 to about 1 mol %. The glass compositions described herein can also include various contaminants associated with batch materials and/or introduced into the glass by the melting, fining, and/or forming equipment used to produce the glass, particularly $Fe_2O_2$ and $ZrO_2$. The glasses can also contain $SnO_2$ either as a result of Joule melting using tin-oxide electrodes and/or through the batching of tin containing materials, e.g., $SnO_2$, SnO, $SnCO_3$, $SnC_2O_2$, etc.

The glass compositions are generally alkali free; however, the glasses can contain some alkali contaminants. In the case of AMLCD applications, it is desirable to keep the alkali levels below 0.1 mole percent to avoid having a negative impact on thin film transistor (TFT) performance through diffusion of alkali ions from the glass into the silicon of the TFT. As used herein, an "alkali-free glass" is a glass having a total alkali concentration which is less than or equal to 0.1 mole percent, where the total alkali concentration is the sum of the $Na_2O$, $K_2O$, and $Li_2O$ concentrations. In one embodiment, the total alkali concentration is less than or equal to 0.1 mole percent.

As discussed above, $(MgO+CaO+SrO+BaO)/Al_2O_3$ ratios greater than or equal to 1.0 improve fining, i.e., the removal of gaseous inclusions from the melted batch materials. This improvement allows for the use of more environmentally friendly fining packages. For example, on an oxide basis, the glass compositions described herein can have one or more or all of the following compositional characteristics: (i) an $As_2O_3$ concentration of at most 0.05 mole percent; (ii) an $Sb_2O_3$ concentration of at most 0.05 mole percent; (iii) a $SnO_2$ concentration of at most 0.25 mole percent.

$As_2O_3$ is an effective high temperature fining agent for AMLCD glasses, and in some embodiments described herein, $As_2O_3$ is used for fining because of its superior fining properties. However, $As_2O_3$ is poisonous and requires special handling during the glass manufacturing process. Accordingly, in certain embodiments, fining is performed without the use of substantial amounts of $As_2O_3$, i.e., the finished glass has at most 0.05 mole percent $As_2O_3$. In one embodiment, no $As_2O_3$ is purposely used in the fining of the glass. In such cases, the finished glass will typically have at most 0.005 mole percent $As_2O_3$ as a result of contaminants present in the batch materials and/or the equipment used to melt the batch materials.

Although not as toxic as $As_2O_3$, $Sb_2O_3$ is also poisonous and requires special handling. In addition, $Sb_2O_3$ raises the density, raises the CTE, and lowers the annealing point in comparison to glasses that use $As_2O_3$ or $SnO_2$ as a fining agent. Accordingly, in certain embodiments, fining is performed without the use of substantial amounts of $Sb_2O_3$, i.e., the finished glass has at most 0.05 mole percent $Sb_2O_3$. In another embodiment, no $Sb_2O_3$ is purposely used in the fining of the glass. In such cases, the finished glass will typically have at most 0.005 mole percent $Sb_2O_3$ as a result of contaminants present in the batch materials and/or the equipment used to melt the batch materials.

Compared to $As_2O_3$ and $Sb_2O_3$ fining, tin fining (i.e., $SnO_2$ fining) is less effective, but $SnO_2$ is a ubiquitous material that has no known hazardous properties. Also, for many years, $SnO_2$ has been a component of AMLCD glasses through the use of tin oxide electrodes in the Joule melting of the batch materials for such glasses. The presence of $SnO_2$ in AMLCD glasses has not resulted in any known adverse effects in the use of these glasses in the manufacture of liquid crystal displays. However, high concentrations of $SnO_2$ are not preferred as this can result in the formation of crystalline defects in AMLCD glasses. In one embodiment, the concentration of $SnO_2$ in the finished glass is less than or equal to 0.25 mole percent.

In some embodiments, it was unexpectedly discovered that higher viscosity glasses described herein can allow a higher concentration of $SnO_2$ without resulting in any deleterious effects to the glass. For example, conventional wisdom would inform one that a glass having a high annealing point results in a high melting temperature. Such high melting temperatures can result in a worse inclusion quality in the respective glass. To address such inclusion quality, finers can be added; however, glasses having a low viscosity generally do not permit the addition of $SnO_2$ due to crystallization thereof in the glass. Exemplary glasses, as described herein, however, can possess a higher viscosity resulting in higher forming temperatures and thus allowing a greater concentration of fining agent to be added to the glass thereby resulting in less inclusions. Simply put, it was discovered that by varying the composition of an exemplary glass to create a higher process temperature, a greater amount of fining agent could be added to remove inclusions before crystallization occurred. Thus, an exemplary glass can include $SnO_2$ at a concentration of between 0.001 mol % and 0.5 mol % and a $T_{35kP}$ greater than or equal to about 1270° C., greater than or equal to about 1280° C., or greater than or equal to about 1290° C. Another exemplary glass can include $SnO_2$ at a concentration of between 0.001 mol % and 0.5 mol % and a $T_{200P}$ greater than or equal to about 1650° C., greater than or equal to about 1660° C., or greater than or equal to about 1670° C. Another exemplary glass can include $SnO_2$ at a concentration of between 0.001 mol % and 0.5 mol % and a $T_{35kP}$ greater than or equal to about 1270° C., greater than or equal to about 1280° C., or greater than or equal to about 1290° C. as well as a $T_{200P}$ greater than or equal to about 1650° C., greater than or equal to about 1660° C., or greater than or equal to about 1670° C. Further exemplary glasses can include include $SnO_2$ at a concentration of between 0.001 mol % and 0.5 mol % and a liquidus temperature of greater than about 1150° C., greater than about 1165° C., or greater than about 1170° C. Such a glass can also have $T_{35kP}$ and/or $T_{200P}$ as discussed above. Of course, $SnO_2$ can be provided to the glass as a result of Joule melting using tin-oxide electrodes and/or through the batching of tin containing materials, e.g., $SnO_2$, SnO, $SnCO_3$, $SnC_2O_2$, etc.

Tin fining can be used alone or in combination with other fining techniques if desired. For example, tin fining can be combined with halide fining, e.g., bromine fining. Other possible combinations include, but are not limited to, tin fining plus sulfate, sulfide, cerium oxide, mechanical bubbling, and/or vacuum fining. It is contemplated that these other fining techniques can be used alone. In certain embodiments, maintaining the $(MgO+CaO+SrO+BaO)/Al_2O_3$ ratio and individual alkaline earth concentrations within the ranges discussed above makes the fining process easier to perform and more effective.

The glasses described herein can be manufactured using various techniques known in the art. In one embodiment, the glasses are made using a downdraw process such as, for example, a fusion downdraw process. In other embodiments, the glasses are made using a float process. In one embodiment, described herein is a method for producing an alkali-free glass sheet manufacturing process comprising selecting, melting, and fining batch materials so that the glass making up the sheets comprises $SiO_2$, $Al_2O_3$, $B_2O_3$, MgO, CaO and BaO, and, on an oxide basis, comprises a (MgO+CaO+SrO+BaO)/$Al_2O_3$ ratio greater than or equal to 1.0.

U.S. Pat. No. 5,785,726 (Dorfeld et al.), U.S. Pat. No. 6,128,924 (Bange et al.), U.S. Pat. No. 5,824,127 (Bange et al.), and U.S. Pat. Nos. 7,628,038 and 7,628,039 (De Angelis, et al.) disclose processes for manufacturing arsenic free glasses. U.S. Pat. No. 7,696,113 (Ellison) discloses a process for manufacturing arsenic- and antimony-free glass using iron and tin to minimize gaseous inclusions.

Some embodiments are directed to a glass comprising in mole percent on an oxide basis: $SiO_2$ 65-75, $Al_2O_3$ 12-14, $B_2O_3$ 0-3, MgO 4-8, CaO 5-10, SrO 0-5, and other oxides including $Y_2O_3$, $ZrO_2$, and ZnO 0-2. In some embodiments, the glass comprises in mole percent on an oxide basis: $SiO_2$ 69-73, $Al_2O_3$ 12-14, $B_2O_3$ 0-3, MgO 4-7, CaO 5-6, SrO 3-4, and other oxides including $Y_2O_3$, $ZrO_2$, and ZnO 0-1. In some embodiments, the glass has a strain point greater than 760° C. In some embodiments, the glass has a 200 Poise temperature less than 1650° C. In some embodiments, the glass has a liquidus temperature below 1300° C. In some embodiments, the glass has a liquidus viscosity greater than 20,000 Poise. In some embodiments, the glass has a Young's modulus greater than 85 GPa. In some embodiments, the glass has a specific modulus greater than 33 GPa/g/cm³.

Some embodiments are directed to a glass comprising in mole percent on an oxide basis: $SiO_2$ 69-74, $Al_2O_3$ 11-14, $B_2O_3$ 0-3, MgO 4-7, CaO 5-7, SrO 0-3, and 1-5% BaO. In some embodiments, the glass comprises in mole percent on an oxide basis: $SiO_2$ 70-73, $Al_2O_3$ 11-14, $B_2O_3$ 0-1, MgO 4-7, CaO 5-7, SrO 0-3, and 1-5% BaO. In some embodiments, the glass has a strain point greater than 752° C. In some embodiments, the glass has a liquidus temperature below 1300° C. In some embodiments, the glass has a liquidus viscosity greater than 20,000 Poise. In some embodiments, the glass has a Young's modulus greater than 83.56 GPa. In some embodiments, the glass has a specific modulus greater than 32 GPa/g/cm³.

Some embodiments are directed to a glass comprising in mole percent on an oxide basis: $SiO_2$ 68.84-74.07, $Al_2O_3$ 10.41-14.87, $B_2O_3$ 0-2, MgO 3.44-7.45, CaO 4.19-8.23, SrO 0-3.36, BaO 0.91-5.59, and $SnO_2$ 0.09-0.2%. In some embodiments, the glass comprises in mole percent on an oxide basis: $SiO_2$ 69.86-72.13, $Al_2O_3$ 11.58-13.01, $B_2O_3$ 0-1, MgO 4.44-6.45, CaO 5.53-7.23, SrO 0.09-1.67, BaO 2.92-4.57, and $SnO_2$ 0.09-0.1%. In some embodiments, the glass has a strain point greater than 760° C. In some embodiments, the glass has a 200 Poise temperature less than 1650° C. In some embodiments, the glass has a liquidus temperature below 1300° C. In some embodiments, the glass has a liquidus viscosity greater than 20,000 Poise. In some embodiments, the glass has a Young's modulus greater than 85 GPa. In some embodiments, the glass has a specific modulus greater than 33 GPa/g/cm³.

Some embodiments are directed to a glass comprising $SiO_2$, $Al_2O_3$, $B_2O_3$, MgO, CaO, SrO, and BaO in mole percent on an oxide basis and having a Young's modulus defined by the relationship: 78 GPa≤69.91973399947+0.803977834357368*$Al_2O_3$−0.906331789808018*B2O3+0.773177760652988*MgO+0.358794596568283*CaO+0.0167545708595792*SrO−0.382565908440928*BaO≤90 GPa. Some embodiments are directed to a glass comprising $SiO_2$, $Al_2O_3$, $B_2O_3$, MgO, CaO, SrO, and BaO in mole percent on an oxide basis and having an annealing temperature defined by the relationship: 750° C.≤854.140323860904+4.46948220485465*$Al_2O_3$−14.4689626526177*B2O3−5.91884532478309*MgO−5.94752853843398*CaO−5.85611498931903*SrO−6.03112833503798*BaO≤860° C.

It will be appreciated that the various disclosed embodiments may involve particular features, elements or steps that are described in connection with that particular embodiment. It will also be appreciated that a particular feature, element or step, although described in relation to one particular embodiment, may be interchanged or combined with alternate embodiments in various non-illustrated combinations or permutations.

It is also to be understood that, as used herein the terms "the," "a," or "an," mean "at least one," and should not be limited to "only one" unless explicitly indicated to the contrary.

Ranges can be expressed herein as from "about" one particular value, and/or to "about" another particular value. When such a range is expressed, examples include from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

The terms "substantial," "substantially," and variations thereof as used herein are intended to note that a described feature is equal or approximately equal to a value or description. Moreover, "substantially similar" is intended to denote that two values are equal or approximately equal. In some embodiments, "substantially similar" may denote values within about 10% of each other, such as within about 5% of each other, or within about 2% of each other.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

While various features, elements or steps of particular embodiments may be disclosed using the transitional phrase "comprising," it is to be understood that alternative embodiments, including those that may be described using the transitional phrases "consisting" or "consisting essentially of," are implied. Thus, for example, implied alternative embodiments to an apparatus that comprises A+B+C include embodiments where an apparatus consists of A+B+C and embodiments where an apparatus consists essentially of A+B+C.

It will be apparent to those skilled in the art that various modifications and variations can be made to the present disclosure without departing from the spirit and scope of the disclosure. Since modifications combinations, sub-combinations and variations of the disclosed embodiments incorporating the spirit and substance of the disclosure may occur to persons skilled in the art, the disclosure should be construed to include everything within the scope of the appended claims and their equivalents.

Examples

The following examples are set forth below to illustrate the methods and results according to the disclosed subject matter. These examples are not intended to be inclusive of all embodiments of the subject matter disclosed herein, but rather to illustrate representative methods and results. These examples are not intended to exclude equivalents and variations of the present disclosure which are apparent to one skilled in the art.

Efforts have been made to ensure accuracy with respect to numbers (e.g., amounts, temperature, etc.) but some errors and deviations should be accounted for. Unless indicated otherwise, temperature is in ° C. or is at ambient temperature, and pressure is at or near atmospheric. The compositions themselves are given in mole percent on an oxide basis and have been normalized to 100%. There are numerous variations and combinations of reaction conditions, e.g., component concentrations, temperatures, pressures and other reaction ranges and conditions that can be used to optimize the product purity and yield obtained from the described process. Only reasonable and routine experimentation will be required to optimize such process conditions.

The glass properties set forth in Table 1 were determined in accordance with techniques conventional in the glass art. Thus, the linear coefficient of thermal expansion (CTE) over the temperature range 25-300° C. is expressed in terms of ppm and the annealing point is expressed in terms of ° C. These were determined from fiber elongation techniques (ASTM references E228-85 and C336, respectively). The density in terms of grams/cm$^3$ was measured via the Archimedes method (ASTM C693). The melting temperature in terms of ° C. (defined as the temperature at which the glass melt demonstrates a viscosity of 200 poises) was calculated employing a Fulcher equation fit to high temperature viscosity data measured via rotating cylinders viscometry (ASTM C965-81). Strain point and annealing point were measured with beam bending viscometer (BBV), and the high temperature viscosity (HTV) above glass softening point (temperature corresponding to glass viscosity equal to $10^{7.6}$ Poise) were measured by rotating cylinder viscometry according to the ASTM C 965 Procedure (B).

The liquidus temperature of the glass in terms of ° C. was measured using the standard gradient boat liquidus method of ASTM C829-81. This involves placing crushed glass particles in a platinum boat, placing the boat in a furnace having a region of gradient temperatures, heating the boat in an appropriate temperature region for 24 hours, and determining by means of microscopic examination the highest temperature at which crystals appear in the interior of the glass. More particularly, the glass sample is removed from the Pt boat in one piece, and examined using polarized light microscopy to identify the location and nature of crystals which have formed against the Pt and air interfaces, and in the interior of the sample. Because the gradient of the furnace is very well known, temperature vs. location can be well estimated, within 5-10° C. The temperature at which crystals are observed in the internal portion of the sample is taken to represent the liquidus of the glass (for the corresponding test period). Testing is sometimes carried out at longer times (e.g. 72 hours), to observe slower growing phases. The liquidus viscosity in poises was determined from the liquidus temperature and the coefficients of the Fulcher equation.

Young's modulus values in terms of GPa were determined using a resonant ultrasonic spectroscopy technique of the general type set forth in ASTM E1875-00e1.

Exemplary glasses are shown in Table 1. As can be seen in Table 1, the exemplary glasses have density, annealing point and Young's modulus values that make the glasses suitable for display applications, such as AMLCD substrate applications, and more particularly for low-temperature polysilicon and oxide thin film transistor applications. Although not shown in Table 1, the glasses have durabilities in acid and base media that are similar to those obtained from commercial AMLCD substrates, and thus are appropriate for AMLCD applications. The exemplary glasses can be formed using downdraw techniques, and in particular are compatible with the fusion process, via the aforementioned criteria.

The exemplary glasses of Table 1 were prepared using a commercial sand as a silica source, milled such that 90% by weight passed through a standard U.S. 100 mesh sieve. Alumina was the alumina source, periclase was the source for MgO, limestone the source for CaO, strontium carbonate, strontium nitrate or a mix thereof was the source for SrO, barium carbonate was the source for BaO, and tin (IV) oxide was the source for $SnO_2$. The raw materials were thoroughly mixed, loaded into a platinum vessel suspended in a furnace heated by silicon carbide glowbars, melted and stirred for several hours at temperatures between 1600 and 1650° C. to ensure homogeneity, and delivered through an orifice at the base of the platinum vessel. The resulting patties of glass were annealed at or near the annealing point, and then subjected to various experimental methods to determine physical, viscous and liquidus attributes.

These methods are not unique, and the glasses of Table 1 can be prepared using standard methods well-known to those skilled in the art. Such methods include a continuous melting process, such as would be performed in a continuous melting process, wherein the melter used in the continuous melting process is heated by gas, by electric power, or combinations thereof.

Raw materials appropriate for producing exemplary glasses include commercially available sands as sources for $SiO_2$; alumina, aluminum hydroxide, hydrated forms of alumina, and various aluminosilicates, nitrates and halides as sources for $Al_2O_3$; boric acid, anhydrous boric acid and boric oxide as sources for $B_2O_3$; periclase, dolomite (also a source of CaO), magnesia, magnesium carbonate, magnesium hydroxide, and various forms of magnesium silicates, aluminosilicates, nitrates and halides as sources for MgO; limestone, aragonite, dolomite (also a source of MgO), wolastonite, and various forms of calcium silicates; aluminosilicates, nitrates and halides as sources for CaO; and oxides, carbonates, nitrates and halides of strontium and barium. If a chemical fining agent is desired, tin can be added as $SnO_2$, as a mixed oxide with another major glass component (e.g., $CaSnO_3$), or in oxidizing conditions as SnO, tin oxalate, tin halide, or other compounds of tin known to those skilled in the art.

The glasses in Table 1 contain $SnO_2$ as a fining agent; but other chemical fining agents could also be employed to obtain glass of sufficient quality for TFT substrate applications. For example, exemplary glasses could employ any one or combinations of $As_2O_3$, $Sb_2O_3$, $CeO_2$, $Fe_2O_3$, and halides as deliberate additions to facilitate fining, and any of these could be used in conjunction with the $SnO_2$ chemical fining agent shown in the examples. Of these, $As_2O_3$ and $Sb_2O_3$ are generally recognized as hazardous materials, subject to control in waste streams such as might be generated in the course of glass manufacture or in the processing of TFT panels. It is therefore desirable to limit the concentration of $As_2O_3$ and $Sb_2O_3$ individually or in combination to no more than 0.005 mol %.

In addition to the elements deliberately incorporated into exemplary glasses, nearly all stable elements in the periodic table are present in glasses at some level, either through low levels of contamination in the raw materials, through high-temperature erosion of refractories and precious metals in the manufacturing process, or through deliberate introduction at low levels to fine tune the attributes of the final glass. For example, zirconium may be introduced as a contaminant via interaction with zirconium-rich refractories. As a further example, platinum and rhodium may be introduced via interactions with precious metals. As a further example, iron may be introduced as a tramp in raw materials, or deliberately added to enhance control of gaseous inclusions. As a further example, manganese may be introduced to control color or to enhance control of gaseous inclusions. As a further example, alkalis may be present as a tramp component at levels up to about 0.1 mol % for the combined concentration of $Li_2O$, $Na_2O$ and $K_2O$.

Hydrogen is inevitably present in the form of the hydroxyl anion, $OH^-$, and its presence can be ascertained via standard infrared spectroscopy techniques. Dissolved hydroxyl ions significantly and nonlinearly impact the annealing point of exemplary glasses, and thus to obtain the desired annealing point it may be necessary to adjust the concentrations of major oxide components so as to compensate. Hydroxyl ion concentration can be controlled to some extent through choice of raw materials or choice of melting system. For example, boric acid is a major source of hydroxyls, and replacing boric acid with boric oxide can be a useful means to control hydroxyl concentration in the final glass. The same reasoning applies to other potential raw materials comprising hydroxyl ions, hydrates, or compounds comprising physisorbed or chemisorbed water molecules. If burners are used in the melting process, then hydroxyl ions can also be introduced through the combustion products from combustion of natural gas and related hydrocarbons, and thus it may be desirable to shift the energy used in melting from burners to electrodes to compensate. Alternatively, one might instead employ an iterative process of adjusting major oxide components so as to compensate for the deleterious impact of dissolved hydroxyl ions.

Sulfur is often present in natural gas; and likewise is a tramp component in many carbonate, nitrate, halide, and oxide raw materials. In the form of $SO_2$, sulfur can be a troublesome source of gaseous inclusions. The tendency to form $SO_2$-rich defects can be managed to a significant degree by controlling sulfur levels in the raw materials, and by incorporating low levels of comparatively reduced multivalent cations into the glass matrix. While not wishing to be bound by theory, it appears that $SO_2$-rich gaseous inclusions arise primarily through reduction of sulfate ($SO_4^=$) dissolved in the glass. The elevated barium concentrations of exemplary glasses appear to increase sulfur retention in the glass in early stages of melting, but as noted above, barium is required to obtain low liquidus temperature, and hence high $T_{35k}-T_{liq}$ and high liquidus viscosity. Deliberately controlling sulfur levels in raw materials to a low level is a useful means of reducing dissolved sulfur (presumably as sulfate) in the glass. In particular, sulfur is preferably less than 200 ppm by weight in the batch materials, and more preferably less than 100 ppm by weight in the batch materials.

Reduced multivalents can also be used to control the tendency of exemplary glasses to form $SO_2$ blisters. While not wishing to be bound to theory, these elements behave as potential electron donors that suppress the electromotive force for sulfate reduction. Sulfate reduction can be written in terms of a half reaction such as $$SO_4^= \rightarrow SO_2 + O_2 + 2e^-$$

where $e^-$ denotes an electron. The "equilibrium constant" for the half reaction is $$K_{eq} = [SO_2][O_2][e^-]^2/[SO_4^=]$$

where the brackets denote chemical activities. Ideally one would like to force the reaction so as to create sulfate from $SO_2$, $O_2$ and $2e^-$. Adding nitrates, peroxides, or other oxygen-rich raw materials may help, but also may work against sulfate reduction in the early stages of melting, which may counteract the benefits of adding them in the first place. $SO_2$ has very low solubility in most glasses, and so is impractical to add to the glass melting process. Electrons may be "added" through reduced multivalents. For example, an appropriate electron-donating half reaction for ferrous iron ($Fe^{2+}$) is expressed as $$2Fe^{2+} \rightarrow 2Fe^{3+} + 2e^-$$

This "activity" of electrons can force the sulfate reduction reaction to the left, stabilizing $SO_4^=$ in the glass. Suitable reduced multivalents include, but are not limited to, $Fe^{2+}$, $Mn^{2+}$, $Sn^{2+}$, $Sb^{3+}$, $As^{3+}$, $V^{3+}$, $Ti^{3+}$, and others familiar to those skilled in the art. In each case, it may be important to minimize the concentrations of such components so as to avoid deleterious impact on color of the glass, or in the case of As and Sb, to avoid adding such components at a high enough level so as to complication of waste management in an end-user's process.

In addition to the major oxides components of exemplary glasses, and the minor or tramp constituents noted above, halides may be present at various levels, either as contaminants introduced through the choice of raw materials, or as deliberate components used to eliminate gaseous inclusions in the glass. As a fining agent, halides may be incorporated at a level of about 0.4 mol % or less, though it is generally desirable to use lower amounts if possible to avoid corrosion of off-gas handling equipment. In some embodiments, the concentrations of individual halide elements are below about 200 ppm by weight for each individual halide, or below about 800 ppm by weight for the sum of all halide elements.

In addition to these major oxide components, minor and tramp components, multivalents and halide fining agents, it may be useful to incorporate low concentrations of other colorless oxide components to achieve desired physical, optical or viscoelastic properties. Such oxides include, but are not limited to, $TiO_2$, $ZrO_2$, $HfO_2$, $Nb_2O_5$, $Ta_2O_5$, $MoO_3$, $WO_3$, $ZnO$, $In_2O_3$, $Ga_2O_3$, $Bi_2O_3$, $GeO_2$, $PbO$, $SeO_3$, $TeO_2$, $Y_2O_3$, $La_2O_3$, $Gd_2O_3$, and others known to those skilled in the art. Through an iterative process of adjusting the relative proportions of the major oxide components of exemplary glasses, such colorless oxides can be added to a level of up to about 2 mol % without unacceptable impact to annealing point, $T_{35k}-T_{liq}$ or liquidus viscosity.

Table 1 shows examples of glasses according to some embodiments.

TABLE 1

| | 1 | 2 | 3 | 4 | 5 | 6 |
|---|---|---|---|---|---|---|
| $SiO_2$ | 72.41 | 72.03 | 71.67 | 72.26 | 70.86 | 70.37 |
| $Al_2O_3$ | 12.53 | 12.48 | 12.35 | 13.09 | 12.29 | 12.23 |
| MgO | 4.68 | 4.63 | 6.13 | 5.67 | 6.98 | 7.05 |
| CaO | 5.85 | 5.85 | 9.73 | 8.87 | 5.77 | 5.80 |
| SrO | 3.96 | 3.94 | — | — | 3.95 | 3.94 |
| $ZrO_2$ | 0.00 | — | — | — | — | 0.48 |
| $Y_2O_3$ | 0.44 | — | — | — | — | 0.00 |
| ZnO | — | 0.93 | — | — | — | — |
| $SnO_2$ | 0.09 | 0.10 | 0.10 | 0.10 | 0.10 | 0.10 |
| Strain point (° C.) | 778.1 | 766.3 | 771 | 775 | 758.7 | 764.8 |
| Annealing point (° C.) | 826.3 | 814.9 | 819.5 | 825 | 808.8 | 811.6 |
| 200 Poise T (° C.) | 1683 | 1684 | 1658 | 1663 | 1658 | 1649 |
| CTE (ppm) | 3.72 | 3.53 | 3.57 | 3.23 | 3.79 | 3.80 |
| Density (g/cc) | 2.569 | 2.561 | 2.491 | 2.483 | 2.558 | 2.574 |
| Young's modulus (GPa) | 86.4 | 85.8 | 87.1 | 87.2 | 86.6 | 87.4 |
| Specific modulus (GPa/g/cc) | 33.6 | 33.5 | 35.0 | 34.8 | 33.9 | 34.0 |
| Liquidus T (° C.) | 1290 | 1275 | 1320 | 1325 | 1270 | 1275 |
| Liquidus phase | cristobalite | cristobalite | cristobalite | cristobalite | slawsonite | anorthite |
| Liquidus visc. (P) | 53,000 | 60,000 | 17,000 | 21,000 | 49,000 | 43,000 |

| | 7 | 8 | 9 | 10 | 11 | 12 |
|---|---|---|---|---|---|---|
| $SiO_2$ | 70.20 | 71.63 | 70.23 | 72.64 | 72.02 | 72.16 |
| $Al_2O_3$ | 12.15 | 12.44 | 13.14 | 12.63 | 12.48 | 13.11 |
| MgO | 6.93 | 4.65 | 5.99 | 4.71 | 4.65 | 5.68 |
| CaO | 5.76 | 5.83 | 5.93 | 5.87 | 5.85 | 5.94 |
| SrO | 3.89 | 3.93 | 3.56 | 4.01 | 3.95 | 2.96 |
| $Y_2O_3$ | — | — | — | — | — | — |
| $ZrO_2$ | 0.92 | 0.91 | 1.01 | — | 0.92 | — |
| ZnO | 0.00 | 0.47 | — | — | 0.00 | — |
| $SnO_2$ | 0.09 | 0.09 | 0.10 | 0.10 | 0.09 | 0.09 |
| Strain point (° C.) | 764.2 | 772.6 | 766.3 | 774.6 | 777.1 | 774 |
| Annealing point (° C.) | 812.6 | 819.6 | 815.9 | 824.8 | 826.6 | 825 |
| 200 Poise T (° C.) | 1614 | 1651 | 1620 | 1700 | 1657 | 1679 |
| CTE (ppm) | 3.88 | 3.64 | 3.82 | 3.61 | 3.68 | 3.26 |
| Density (g/cc) | 2.62 | 2.611 | 2.61 | 2.54 | 2.6 | 2.528 |
| Young's modulus (GPa) | 88.2 | 87.2 | 88.4 | 86.0 | 87.2 | 86.9 |
| Specific modulus (GPa/g/cc) | 33.7 | 33.4 | 33.9 | 33.9 | 33.6 | 34.4 |
| Liquidus T (° C.) | 1255 | 1310 | 1265 | 1285 | 1290 | 1290 |
| Liquidus phase | cristobalite | cristobalite | slawsonite | slawsonite | cristobalite | cristobalite |
| Liquidus visc. (P) | 50,000 | 25,000 | 39,000 | 65,000 | 41,000 | 49,000 |

| | 13 | 14 | 15 | 16 | 17 | 18 |
|---|---|---|---|---|---|---|
| $SiO_2$ | 70.20 | 70.66 | 69.98 | 72.31 | 71.09 | 72.31 |
| $Al_2O_3$ | 12.17 | 12.20 | 12.06 | 12.55 | 13.21 | 13.04 |
| MgO | 6.96 | 6.91 | 6.89 | 4.68 | 6.08 | 5.61 |
| CaO | 5.74 | 5.75 | 5.71 | 5.86 | 9.50 | 5.37 |
| SrO | 3.88 | 3.91 | 3.85 | 3.98 | — | 3.53 |
| $ZrO_2$ | 0.49 | 0.00 | — | 0.48 | — | — |
| $Y_2O_3$ | 0.44 | 0.44 | 0.91 | — | — | — |
| ZnO | — | — | 0.46 | — | — | — |
| $SnO_2$ | 0.09 | 0.09 | 0.09 | 0.10 | 0.10 | 0.10 |
| Strain point (° C.) | 763.9 | 765.8 | 757.3 | 780 | 774.6 | 774.3 |
| Annealing point (° C.) | 812.6 | 814.1 | 804.9 | 830.1 | 821.6 | 824.8 |
| 200 Poise T (° C.) | 1633 | 1639 | 1611 | 1693 | 1635 | 1685 |
| CTE (ppm) | 3.81 | 3.77 | 3.84 | 3.58 | 3.36 | 3.6 |
| Density (g/cc) | 2.603 | 2.585 | 2.63 | 2.553 | 2.496 | 2.534 |
| Young's modulus (GPa) | 88.1 | 87.2 | 88.8 | 85.9 | 87.9 | 86.2 |
| Specific modulus (GPa/g/cc) | 33.8 | 33.7 | 33.8 | 33.7 | 35.2 | 34.0 |
| Liquidus T (° C.) | 1260 | 1300 | 1265 | 1285 | 1295 | 1280 |
| Liquidus phase | cristobalite | cristobalite | cristobalite | cristobalite | anorthite | slawsonite |
| Liquidus visc. (P) | 49,000 | 24,000 | 31,000 | 68,000 | 20,000 | 59,000 |

| | 19 | 20 | 21 | 22 |
|---|---|---|---|---|
| $SiO_2$ | 70.13 | 70.65 | 71.13 | 72.20 |
| $Al_2O_3$ | 12.17 | 13.03 | 13.17 | 12.43 |
| MgO | 6.96 | 5.97 | 6.02 | 4.61 |

TABLE 1-continued

|  | | | | |
| --- | --- | --- | --- | --- |
| CaO | 5.76 | 5.84 | 5.94 | 5.81 |
| SrO | 3.90 | 3.48 | 3.60 | 3.92 |
| $ZrO_2$ | — | 0.39 | — | 0.48 |
| $Y_2O_3$ | 0.00 | 0.50 | — | 0.43 |
| ZnO | 0.94 | — | — | — |
| $SnO_2$ | 0.10 | 0.09 | 0.10 | 0.09 |
| Strain point (° C.) | 753.4 | 768.8 | 771.8 | 779.9 |
| Annealing point (° C.) | 802.5 | 817.9 | 820.5 | 827 |
| 200 Poise T (° C.) | 1642 | 1643 | 1681 | 1674 |
| CTE (ppm) | 3.55 | 3.66 | 3.67 | 3.64 |
| Density (g/cc) | 2.581 | 2.596 | 2.548 | 2.582 |
| Young's modulus (GPa) | 86.8 | 88.5 | 86.5 | 86.7 |
| Specific modulus (GPa/g/cc) | 33.6 | 34.1 | 34.0 | 33.6 |
| Liquidus T (° C.) | 1260 | 1270 | 1280 | 1285 |
| Liquidus phase | cristobalite | slawsonite | slawsonite | cristobalite |
| Liquidus visc.(P) | 47,000 | 42,000 | 51,000 | 54,000 |

Figure 8:
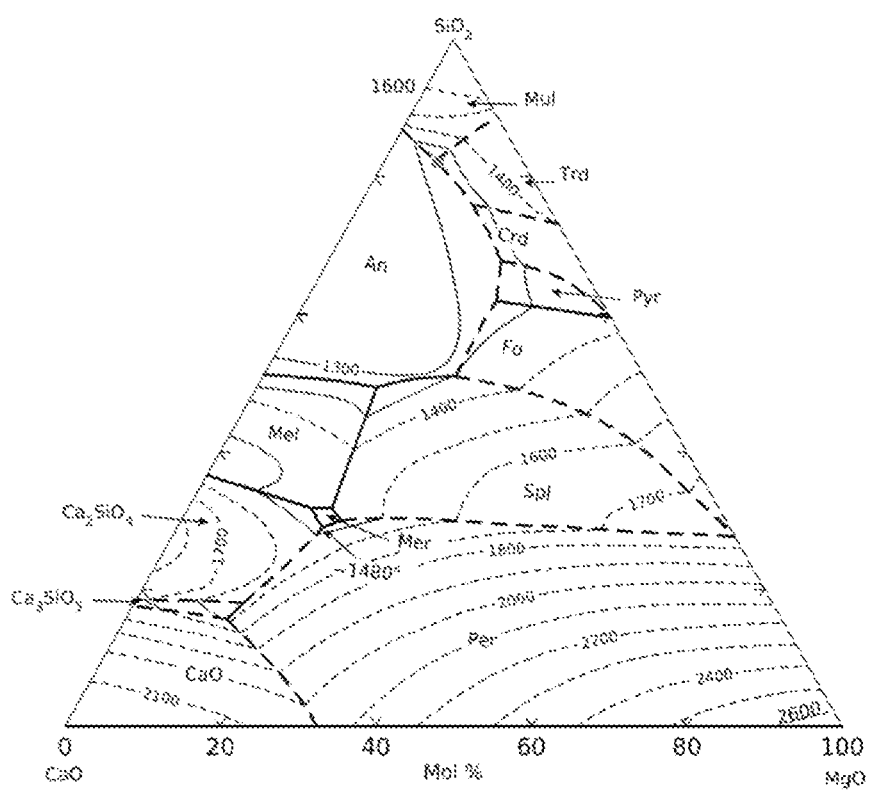
FIG. 8 is a graph of a MgO—CaO—$SiO_2$—$Al_2O_3$ (20 wt % $Al_2O_3$) system.

With reference to Table 1 above, Example 3 provides a eutectic point for mullite, tridymite and anorthite in a MgO—CaO—SiO$_2$—Al$_2$O$_3$ (20 wt %) system (see, e.g., FIG. 8). This embodiment provides many desirable properties, such as high strain point, high Young's modulus and low 200 Poise temperature, low CTE and low density. However, the liquidus temperature for Example 3 is high (1320° C.) and liquidus viscosity is low (17,000 Poise), which poses some difficulties for certain manufacturing processes. Example 17 provides an increase of about 1 mol % Al$_2$O$_3$ relative to Example 3, which increases strain point, Young's modulus, further decreases 200 Poise temperature, decreases liquidus temperature and increases liquidus viscosity. Example 21 substitutes a portion of CaO in Example 17 with SrO to further improve liquidus and which successfully decreased liquidus temperature and doubled liquidus viscosity. Adding Y$_2$O$_3$ and ZrO$_2$ (Examples 9 and 20) in Example 21 decreased the liquidus temperature more, and maintained a high strain point and high Young's modulus.

The inclusion of Y$_2$O$_3$ and ZrO$_2$ in some embodiments can be used to increase Young's modulus. Example 10 is a variant of Example 12 with a reduced concentration of Al$_2$O$_3$ and increase in alkaline-earths to improve liquidus viscosity. To decrease liquidus temperature in Example 10, a small amount of Y$_2$O$_3$, ZnO and ZrO$_2$ was added. Thus, with 1 mol % Y$_2$O$_3$ (Example 16) and 1 mol % Y$_2$O$_3$+0.5 mol % ZnO (Example 8), the melting temperature (200 Poise temperature) was reduced about 50° C. but the liquidus temperatures were maintained. Example 5 is also a variant of Example 10 with a reduced SiO$_2$ and increase in alkaline-earths to improve melting temperature, which was decreased 40° C. from Example 10. A small amount of Y$_2$O$_3$, ZnO and ZrO$_2$ were added into Example 5 to improve other properties. The remaining examples in Table 1 also provide an improved Young's modulus and reduced melting temperature.

Table 2 shows further examples of glasses according to some embodiments.

TABLE 2

|  | 23 | 24 | 25 | 26 | 27 | 28 |
| --- | --- | --- | --- | --- | --- | --- |
| $SiO_2$ | 72.86 | 72.12 | 70.93 | 71.58 | 72.04 | 69.66 |
| $Al_2O_3$ | 11.43 | 12.03 | 12.42 | 12.51 | 12.33 | 13.13 |
| $B_2O_3$ | 0.00 | 0.00 | 0.21 | 0.51 | 0.00 | 0.00 |
| MgO | 5.50 | 5.61 | 6.12 | 5.18 | 5.57 | 5.90 |
| CaO | 5.32 | 5.80 | 6.16 | 5.56 | 5.55 | 5.98 |
| SrO | 1.21 | 2.36 | 0.78 | 0.89 | 1.01 | 1.03 |
| BaO | 3.57 | 1.91 | 3.23 | 3.61 | 3.38 | 4.11 |
| $SnO_2$ | 0.10 | 0.12 | 0.10 | 0.10 | 0.11 | 0.12 |
| Strain point (° C.) | 759.70 | 764.30 | 759.90 | 757.20 | 769.30 | 760.50 |
| Annealing point (° C.) | 811.50 | 815.70 | 810.60 | 810.10 | 819.80 | 810.60 |
| 200 Poise T (° C.) | 1711.00 | 1694.00 | 1678.00 | 1695.00 | 1700.00 | 1719.00 |
| CTE (ppm) | 3.77 | 3.65 | 3.72 | 3.63 | 3.80 | 3.78 |
| Density (g/cc) | 2.60 | 2.57 | 2.59 | 2.59 | 2.59 | 2.64 |
| Young's modulus (GPa) | 83.56 | 84.67 | 84.46 | 84.10 | 83.91 | 85.49 |
| Specific modulus (GPa/g/cc) | 32.12 | 32.91 | 32.57 | 32.31 | 32.35 | 32.35 |
| Liquidus T (° C.) | 1240.00 | 1245.00 | 1230.00 | 1250.00 | 1255.00 | >1265 |
| Liquidus phase | Cristobalite | Cristobalite | Celsian | Celsian | unknown | Cristobalite |
| Liquidus visc. (P) | 1.78E+05 | 1.39E+05 | 1.46E+05 | 1.21E+05 | 1.14E+05 | 1.10E+05 |
|  | 29 | 30 | 31 | 32 | 33 | 34 | 35 |
| $SiO_2$ | 71.72 | 72.13 | 69.86 | 72.99 | 73.07 | 72.20 | 71.24 |
| $Al_2O_3$ | 12.76 | 11.58 | 12.83 | 11.41 | 11.90 | 12.65 | 12.63 |
| $B_2O_3$ | 0.00 | 0.00 | 0.00 | 0.00 | 0.00 | 0.62 | 0.00 |
| MgO | 6.10 | 5.63 | 5.61 | 5.66 | 4.98 | 5.85 | 5.26 |
| CaO | 5.46 | 5.93 | 6.33 | 5.44 | 5.19 | 5.53 | 5.96 |

TABLE 2-continued

|  |  |  |  |  |  |  |  |
|---|---|---|---|---|---|---|---|
| SrO | 1.61 | 0.20 | 1.67 | 1.01 | 1.51 | 0.09 | 0.15 |
| BaO | 2.24 | 4.30 | 3.40 | 3.38 | 3.23 | 2.92 | 4.59 |
| $SnO_2$ | 0.11 | 0.09 | 0.10 | 0.10 | 0.10 | 0.10 | 0.10 |
| Strain point (° C.) | 769.50 | — | — | 761.70 | 765.90 | 764.60 | 760.60 |
| Annealing point (° C.) | 818.90 | 813.00 | 812.33 | 813.60 | 818.20 | 815.60 | 812.80 |
| 200 Poise T (° C.) | 1683.00 | 1700 | 1662 | 1717.00 | 1710.00 | 1703.00 | 1699.00 |
| CTE (ppm) | 3.63 |  |  | 3.64 | 3.59 | 3.48 | 3.79 |
| Density (g/cc) | 2.57 | 2.61 | 2.63 | 2.59 | 2.59 | 2.55 | 2.62 |
| Young's modulus (GPa) | 85.36 | 84.13 | 85.47 | 83.56 | 83.63 | 83.98 | 84.51 |
| Specific modulus (GPa/g/cc) | 33.17 | 32.02 | 32.35 | 32.24 | 32.24 | 32.92 | 32.09 |
| Liquidus T (° C.) | 1270.00 | 1220 | 1275 | 1255.00 | 1240.00 | 1235.00 | 1220.00 |
| Liquidus phase | unknown | Cristobalite | Anorthite | Cristobalite | Cristobalite | Celsian | Celsian |
| Liquidus visc. (P) | 7.21E+04 | 5.45 | 4.69 | 1.23E+05 | 1.79E+05 | 1.89E+05 | 2.54E+05 |

|  | 36 | 37 | 38 | 39 | 40 | 41 | 42 |
|---|---|---|---|---|---|---|---|
| $SiO_2$ | 72.11 | 69.64 | 71.86 | 70.14 | 71.82 | 71.74 | 72.04 |
| $Al_2O_3$ | 12.34 | 13.08 | 11.58 | 11.99 | 12.35 | 13.01 | 12.36 |
| $B_2O_3$ | 0.00 | 0.00 | 0.00 | 0.00 | 0.00 | 0.28 | 0.00 |
| MgO | 6.14 | 6.44 | 5.91 | 6.45 | 5.59 | 4.85 | 6.12 |
| CaO | 5.46 | 5.44 | 5.72 | 6.45 | 5.81 | 5.75 | 5.49 |
| SrO | 1.60 | 2.07 | 0.29 | 6.48 | 1.54 | 0.19 | 1.41 |
| BaO | 2.23 | 3.16 | 4.40 | 4.53 | 2.73 | 4.01 | 2.45 |
| $SnO_2$ | 0.11 | 0.11 | 0.10 | 0.10 | 0.11 | 0.10 | 0.11 |
| Strain point (° C.) | 768.80 | 759.90 | — | — | 768.00 | 767.20 | 766.20 |
| Annealing point (° C.) | 819.70 | 810.40 | 811.17 | 804.79 | 818.90 | 817.00 | 817.40 |
| 200 Poise T (° C.) | 1693.00 | 1708.00 | 1709 | 1679 | 1690.00 | 1714.00 | 1692.00 |
| CTE (ppm) | 3.62 | 3.68 |  |  | 3.75 | 3.61 | 3.66 |
| Density (g/cc) | 2.57 | 2.63 | 2.62 | 2.64 | 2.59 | 2.59 | 2.57 |
| Young's modulus (GPa) | 85.22 | 85.49 | 84.22 | 85.14 | 84.25 | 84.38 | 85.29 |
| Specific modulus (GPa/g/cc) | 33.15 | 32.51 | 31.98 | 32.02 | 32.58 | 32.40 | 33.15 |
| Liquidus T (° C.) | 1280.00 | 1265.00 | 1220 | 1230 | 1240.00 | 1245.00 | 1265.00 |
| Liquidus phase | unknown | Cordierite | Cristobalite | Celsian | Cordierite | Celsian | unknown |
| Liquidus visc. (P) | 6.24E+04 | 9.36E+04 | 5.38 | 5.11 | 1.44E+05 | 1.59E+05 | 8.69E+04 |

|  | 43 | 44 | 45 | 46 | 47 | 48 | 49 |
|---|---|---|---|---|---|---|---|
| $SiO_2$ | 71.48 | 71.25 | 71.99 | 71.78 | 70.84 | 71.47 | 70.34 |
| $Al_2O_3$ | 12.67 | 12.46 | 12.37 | 12.93 | 13.87 | 12.52 | 12.46 |
| $B_2O_3$ | 0.00 | 0.00 | 0.00 | 0.00 | 0.33 | 0.51 | 1.00 |
| MgO | 5.80 | 4.44 | 6.06 | 5.48 | 5.15 | 5.19 | 5.18 |
| CaO | 5.47 | 7.23 | 5.55 | 5.62 | 5.50 | 5.95 | 6.43 |
| SrO | 2.01 | 0.13 | 1.01 | 1.48 | 1.00 | 0.19 | 1.18 |
| BaO | 2.40 | 4.19 | 2.91 | 2.56 | 3.14 | 4.02 | 3.21 |
| $SnO_2$ | 0.12 | 0.10 | 0.11 | 0.12 | 0.15 | 0.10 | 0.09 |
| Strain point (° C.) | 766.90 |  | 768.20 | 770.10 | 771.50 | 759.60 |  |
| Annealing point (° C.) | 817.20 | 817.33 | 817.50 | 821.40 | 820.90 | 809.50 | 800.95 |
| 200 Poise T (° C.) | 1684.00 | 1699 | 1693.00 | 1724.00 | 1672.00 | 1691.00 | 1663 |
| CTE (ppm) | 3.70 |  | 3.66 | 3.49 | 3.53 | 3.66 |  |
| Density (g/cc) | 2.59 | 2.62 | 2.58 | 2.58 | 2.60 | 2.59 | 2.60 |
| Young's modulus (GPa) | 84.60 | 84.34 | 84.94 | 85.36 | 84.12 | 83.56 | 84.21 |
| Specific modulus (GPa/g/cc) | 32.70 | 32.05 | 32.95 | 33.08 | 32.36 | 32.26 | 32.19 |
| Liquidus T (° C.) | 1260.00 | 1260 | >1270 | >1285 | >1260 | 1260.00 | 1235 |
| Liquidus phase | Cordierite | Anorthite | unknown | Cristobalite | Mullite | Celsian | Anorthite |
| Liquidus visc. (P) | 9.10E+04 | 4.98 | 7.98E+04 | 9.41E+04 | 8.66E+04 | 1.03E+05 | 5.05 |

Figure 4:
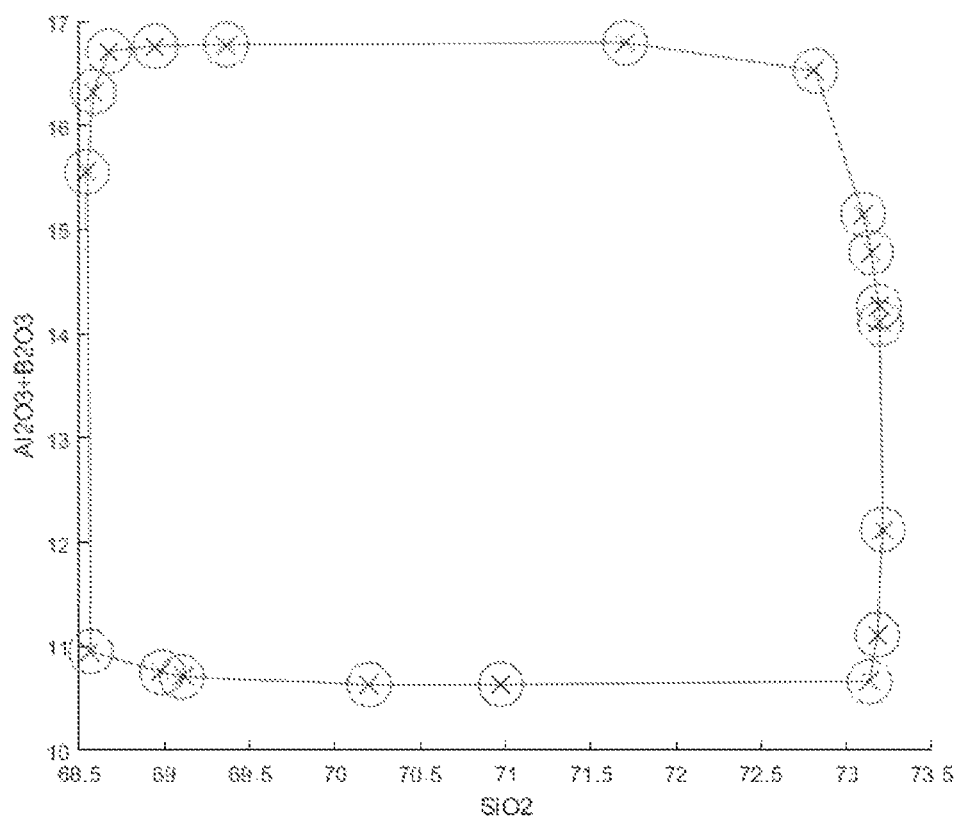
FIG. 4 is a graph of a boundary for a convex hull of some embodiments.
Figure 5:
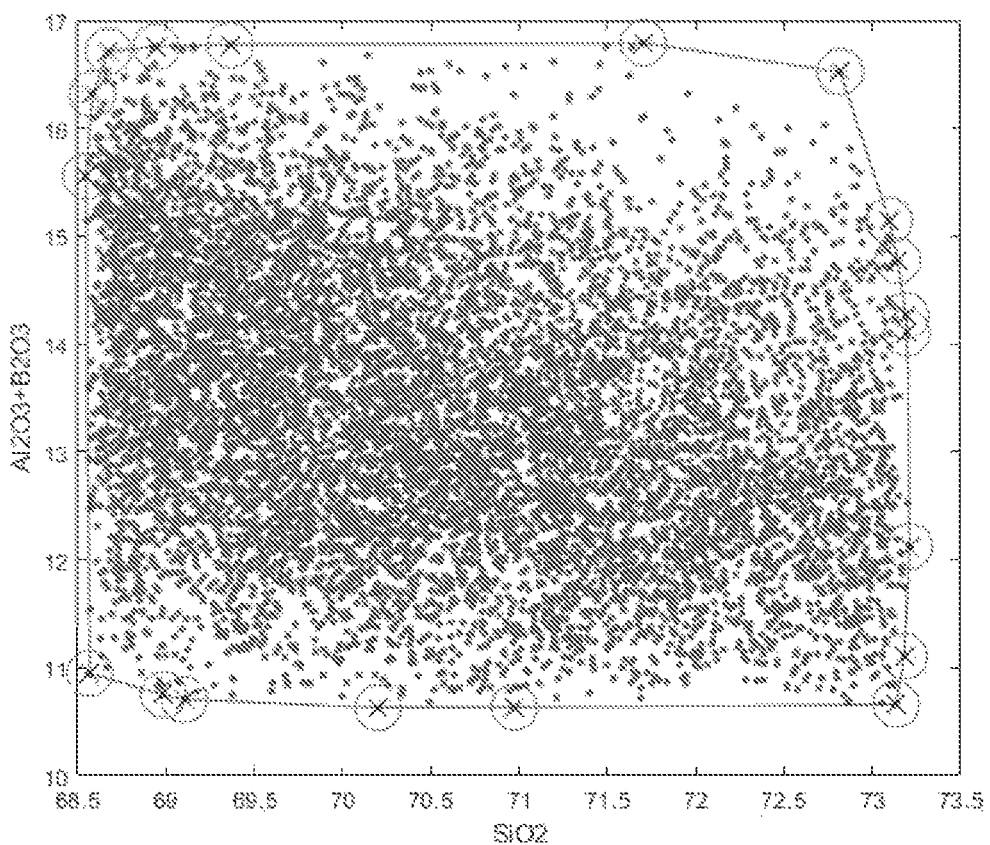
FIG. 5 is a graph of the convex hull of FIG. 4 with sets of exemplary compositions therein.

In some embodiments, an exemplary composition may be described by a Convex Hull which can be defined as the smallest convex boundary that contains a set of points in a space of a given dimension. For example, if one considers the space bounded by the following: 68.64-74.07 mol % $SiO_2$, 10.41-14.87 mol % $Al_2O_3$, 0-2 mol % $B_2O_3$, 3.44-7.45 mol % MgO, 4.19-8.23 mol % CaO, 0-3.36 mol % SrO, 0.91-5.59 mol % BaO, and 0.09-0.2 mol % $SnO_2$, one can group Al2O3 and B2O3 into a group named Al2O3_B2O3 and the rest into a group named RO containing MgO, CaO, SrO, BaO and SnO2 in their respective ranges. A new ternary space can then defined by the space for which the boundary is set by the following compositions in mol %, as shown in Table 3, and FIGS. 4 and 5.

TABLE 3

| $SiO_2$ | $Al_2O_3$_$B_2O_3$ | RO |
|---|---|---|
| 70.20 | 10.63 | 19.17 |
| 70.97 | 10.63 | 18.39 |
| 73.13 | 10.66 | 16.20 |
| 73.18 | 11.11 | 15.71 |
| 73.21 | 12.12 | 14.67 |

TABLE 3-continued

| SiO$_2$ | Al$_2$O$_3$—B$_2$O$_3$ | RO |
|---|---|---|
| 73.20 | 14.10 | 12.71 |
| 73.19 | 14.26 | 12.55 |
| 73.14 | 14.78 | 12.08 |
| 73.10 | 15.15 | 11.76 |
| 72.82 | 16.52 | 10.66 |
| 71.70 | 16.79 | 11.51 |
| 69.36 | 16.78 | 13.86 |
| 68.95 | 16.76 | 14.29 |
| 68.67 | 16.71 | 14.61 |
| 68.58 | 16.32 | 15.10 |
| 68.55 | 15.55 | 15.90 |
| 68.57 | 10.95 | 20.48 |
| 68.99 | 10.75 | 20.26 |
| 69.10 | 10.71 | 20.19 |

Compositions in the Convex Hull delimited by the boundary made up with the compositions listed in Table 3 above have annealing points and Young's modulus given by Equations 2 and 3, respectively, in which the oxides are measured in mol %:

$$78 \text{ GPa} \leq 69.91973399947 + \\ 0.803977834357368*Al2O3 - \\ 0.906331789808018*B2O3 + \\ 0.773177760652988*MgO + \\ 0.358794596568283*CaO + \\ 0.0167545708595792*SrO - \\ 0.382565908440928*BaO \leq 90 \text{ GPa} \quad (2)$$

$$750° \text{ C.} \leq 854.140323860904 + \\ 4.46948220485465*Al2O3 - \\ 14.4689626526177*B2O3 - \\ 5.91884532478309*MgO - \\ 5.94752853843398*CaO - \\ 5.85611498931903*SrO - \\ 6.03112833503798*BaO \leq 860° \text{ C.} \quad (3)$$

Figure 6:
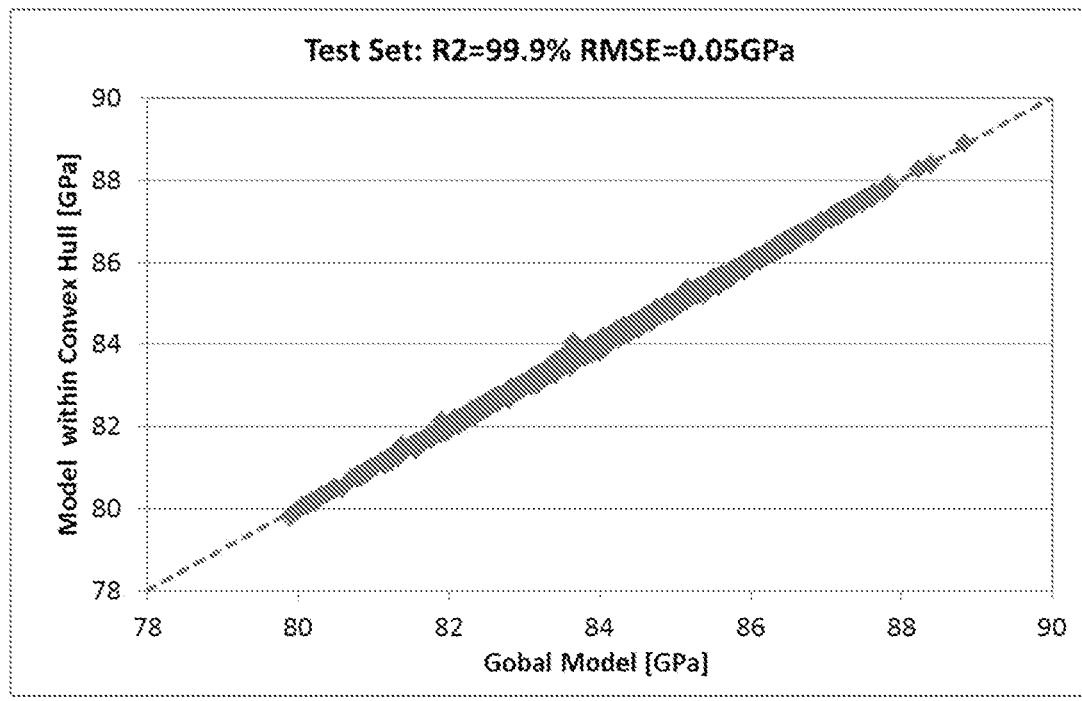
FIG. 6 is a graph of Equation (2) for randomly selected compositions within the convex hull of FIG. 4.
Figure 7:
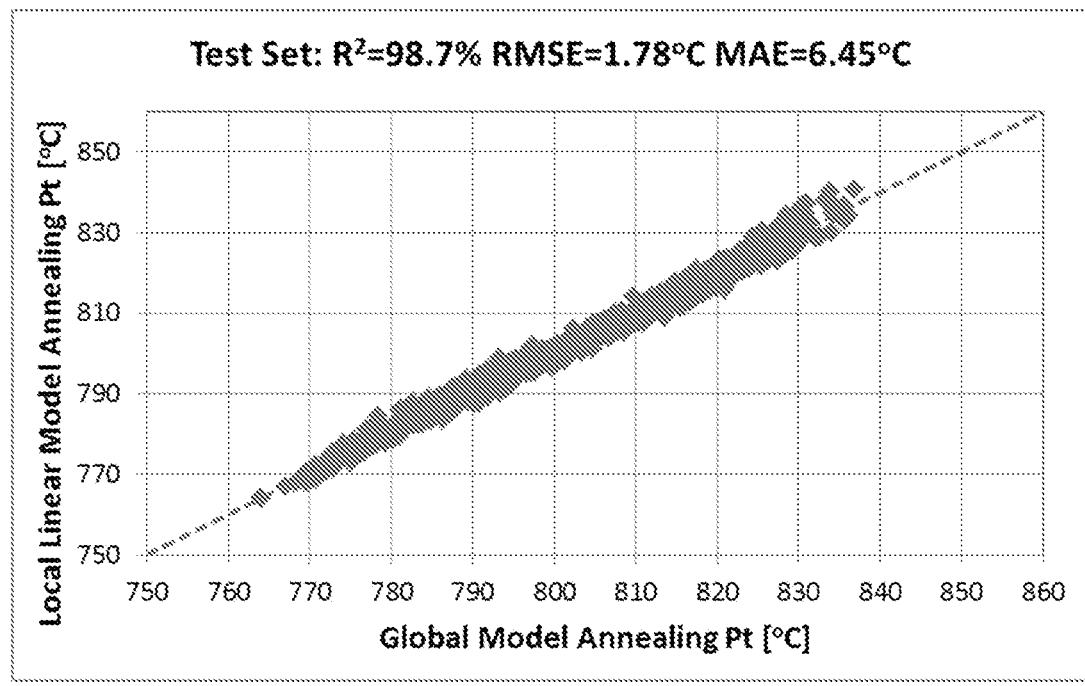
FIG. 7 is a graph of Equation (3) for randomly selected compositions within the convex hull of FIG. 4.

FIGS. 6 and 7 are predicted Young's modulus and annealing points using equations (2) and (3) respectively against global models with a much larger composition set for a sample set of compositions randomly selected from the Convex Hull (FIGS. 4 and 5) delimited by the composition boundary shown in Table 3. These figures illustrate an agreement between the simple linear models from the data inside the Convex Hull and the global models. Linear models can be built once a random extraction of 1000 data from the Convex Hull is performed with a prediction of their respective Young's modulus and Annealing points. Equations (2) and (3) are valid representations of the Young's modulus and Annealing Points within the Convex Hull.

Compositions within the Convex Hull which boundary is given by compositions listed in Table 3, within which compositions, in mol %, have their Young's modulus and Annealing point given by Equation (2) and Equation (3) respectively.

What is claimed is:

1. A glass comprising in mole percent on an oxide basis:
SiO$_2$ 69-74,
Al$_2$O$_3$ 11-14,
B$_2$O$_3$ 0-3,
MgO 4-7,
CaO 5-7,
SrO 0-2.01, and
BaO 1.91-5,
wherein the glass has a strain point greater than 752° C. and a Young's modulus greater than 83.56 GPa, and wherein the glass is free of Fe$_2$O$_3$.

2. The glass of claim 1, wherein the glass comprises in mole percent on an oxide basis:
SiO$_2$ 70-73,
Al$_2$O$_3$ 11-14,
B$_2$O$_3$ 0-1,
MgO 4-7,
CaO 5-7,
SrO 0-2.01, and
BaO 1.91-5.

3. The glass of claim 1, wherein the glass comprises BaO in a range of from 2.92 to 4.57 mole percent.

4. The glass of claim 1, wherein the glass has an annealing temperature defined by the relationship:

$$810° \text{ C.} \leq 854.140323860904 + \\ 4.46948220485465*Al_2O_3 - \\ 14.4689626526177*B2O3 - \\ 5.91884532478309*MgO - \\ 5.94752853843398*CaO - \\ 5.85611498931903*SrO - \\ 6.03112833503798*BaO \leq 860° \text{ C.}$$

5. The glass of claim 1, wherein the glass has a liquidus temperature below 1300° C.

6. The glass of claim 1, wherein the glass has a liquidus viscosity greater than 20,000 Poise.

7. The glass of claim 1, wherein the glass has a specific modulus greater than 32 GPa/g/cm$^3$.

8. The glass of claim 1, wherein the glass has a Young's modulus defined by the relationship:

$$83.56 \text{ GPa} \leq 69.91973399947 + \\ 0.803977834357368*Al_2O_3 - \\ 0.906331789808018*B2O3 + \\ 0.773177760652988*MgO + \\ 0.358794596568283*CaO + \\ 0.0167545708595792*SrO - \\ 0.382565908440928*BaO \leq 90 \text{ GPa}.$$

9. A liquid crystal display substrate comprising the glass of claim 8 or claim 4.

10. A liquid crystal display substrate comprising the glass of claim 1.

* * * * *